United States Patent
Koh et al.

(10) Patent No.: US 11,005,612 B2
(45) Date of Patent: May 11, 2021

(54) DEVICE AND METHOD FOR NON-ORTHOGONAL MULTIPLE ACCESS IN WIRELESS COMMUNICATION SYSTEM

(71) Applicants: Samsung Electronics Co., Ltd., Suwon-si (KR); KOREA ADVANCED INSTITUTE OF SCIENCE AND TECHNOLOGY, Daejeon (KR)

(72) Inventors: Jeongwan Koh, Daejeon (KR); Joonhyuk Kang, Daejeon (KR); Jongmok Kim, Seongnam-si (KR); Sangwook Suh, Yongin-si (KR)

(73) Assignees: Samsung Electronics Co., Ltd., Suwon-si (KR); Korea Advanced Institute of Science and Technology, Daejeon (KR)

( * ) Notice: Subject to any disclaimer, the term of this patent is extended or adjusted under 35 U.S.C. 154(b) by 439 days.

(21) Appl. No.: 16/063,688

(22) PCT Filed: Dec. 16, 2016

(86) PCT No.: PCT/KR2016/014793
§ 371 (c)(1),
(2) Date: Jun. 18, 2018

(87) PCT Pub. No.: WO2017/105126
PCT Pub. Date: Jun. 22, 2017

(65) Prior Publication Data
US 2020/0295891 A1    Sep. 17, 2020

(30) Foreign Application Priority Data
Dec. 18, 2015 (KR) .......................... 10-2015-0181684

(51) Int. Cl.
H04L 5/00 (2006.01)
H04B 7/0417 (2017.01)
H04B 7/06 (2006.01)

(52) U.S. Cl.
CPC ......... *H04L 5/0026* (2013.01); *H04B 7/0417* (2013.01); *H04B 7/0626* (2013.01); *H04L 5/0037* (2013.01)

(58) Field of Classification Search
None
See application file for complete search history.

(56) References Cited

U.S. PATENT DOCUMENTS

2003/0125040 A1* 7/2003 Walton ................. H04B 7/0891
                                                         455/454
2011/0250848 A1  10/2011 Bergljung et al.
(Continued)

FOREIGN PATENT DOCUMENTS

JP    2014-154962 A    8/2014

OTHER PUBLICATIONS

ISA/KR, "International Search Report and Written Opinion of the International Searching Authority," International Application No. PCT/KR2016/014793, dated Mar. 20, 2017, 15 pages.
(Continued)

*Primary Examiner* — Anh Vu H Ly

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). According to various embodiments in the present disclosure, an operating method of a base station in a wireless communication system may include determining a transmission mode of the greatest channel capacity among a plurality of transmission modes based on first channel information of a first terminal
(Continued)

and second channel information of a second terminal, and transmitting a transmit signal generated based on the determined transmission mode to the first terminal and the second terminal. The first transmission mode of the plurality of the transmission modes may be a transmission mode for applying a diversity scheme to a first signal for the first terminal, applying a multiplexing scheme to a second signal for the second terminal, and transmitting the transmit signal comprising the first signal and the second signal in a non-orthogonal multiple access (NOMA) scheme.

17 Claims, 13 Drawing Sheets

(56) References Cited

U.S. PATENT DOCUMENTS

| | | |
|---|---|---|
| 2013/0028309 A1 | 1/2013 | Park et al. |
| 2014/0044091 A1 | 2/2014 | Kishiyama |
| 2014/0071912 A1* | 3/2014 | Hou .................. H04B 7/024 370/329 |
| 2015/0296462 A1 | 10/2015 | Sun et al. |
| 2015/0312074 A1 | 10/2015 | Zhu et al. |
| 2015/0349866 A1* | 12/2015 | Benjebbour ........ H04W 72/042 370/329 |
| 2016/0029350 A1 | 1/2016 | Kishiyama et al. |
| 2016/0037460 A1* | 2/2016 | Benjebbour .......... H04L 5/0044 370/329 |
| 2016/0088646 A1* | 3/2016 | Sun .................. H04B 7/0619 370/329 |
| 2016/0337018 A1* | 11/2016 | Hwang ............... H04W 52/325 |
| 2016/0337879 A1* | 11/2016 | Hwang ............. H04W 72/1231 |
| 2017/0041906 A1* | 2/2017 | Tsai .................... H04L 1/0009 |
| 2018/0249452 A1* | 8/2018 | Lee .................... H04L 27/26 |

OTHER PUBLICATIONS

Chen, Xiaohang, et al., "Evaluations of Downlink Non-Orthogonal Multiple Access (NOMA) Combined with SU-MIMO," 2014 IEEE 25th International Symposium on Personal, Indoor and Mobile Radio Communications, 2014, IEEE, 5 pages.

Otao, Nagisa, et al., "Performance of Non-orthogonal Access with SIC in Cellular Downlink Using Proportional Fair-Based Resource Allocation," IEEE, 2012, 5 pages.

* cited by examiner

DEVICE AND METHOD FOR NON-ORTHOGONAL MULTIPLE ACCESS IN WIRELESS COMMUNICATION SYSTEM

CROSS-REFERENCE TO RELATED APPLICATIONS AND CLAIM OF PRIORITY

This application is a 371 National Stage of International Application No. PCT/KR2016/014793 filed Dec. 16, 2016, which claims priority to Korean Patent Application No. KR 10-2015-0181684 filed Dec. 18, 2015, the disclosures of which are herein incorporated by reference in their entirety.

BACKGROUND

1. Field

The present disclosure generally relates to a wireless communication system, and more specifically, relates to an apparatus and a method for non orthogonal multiple access (NOMA).

2. Description of Related Art

To satisfy a wireless data traffic demand which is growing after a 4th generation (4G) communication system is commercialized, efforts are exerted to develop an advanced 5th generation (5G) communication system or a pre-5G communication system. For this reason, the 5G communication system or the pre-5G communication system is referred to as a beyond 4G network communication system or a post Long Term Evolution (LTE) system. To achieve a high data rate, the 5G communication system considers its realization in an extremely high frequency (mmWave) band (e.g., 60 GHz band). To mitigate a path loss of propagation and to extend a propagation distance in the extremely high frequency band, the 5G communication system is discussing beamforming, massive multiple input multiple output (MIMO), full dimensional (FD)-MIMO, array antenna, analog beamforming, and large scale antenna technologies. Also, for network enhancement of the system, the 5G communication system is developing techniques such as evolved small cell, advanced small cell, cloud radio access network (RAN), ultra-dense network, device to device (D2D) communication, wireless backhaul, moving network, cooperative communication, coordinated multi-points (CoMP), and receive interference cancellation. Besides, the 5G system is working on hybrid frequency shift keying and quadrature amplitude modulation (FQAM) and sliding window superposition coding (SWSC) as advanced coding modulation (ACM) schemes, and filter bank multi carrier (FBMC), non orthogonal multiple access (NOMA), and sparse code multiple access (SCMA) as advanced access technologies.

Meanwhile, the Internet is now evolving from a human centered connectivity network where humans create and consume information, to Internet of things (IoT) where distributed entities such as things exchange and process information. Internet of everything (IoE), which is a combination of the IoT technology and big data processing technology through connection with a cloud server, has emerged. As technology elements such as sensing technology, wired/wireless communication and network infrastructure, service interface technology, and security technology are demanded for IoT implementation, technique such as sensor network, machine-to-machine (M2M) communication, and machine type communication (MTC) are studied recently. An IoT environment may provide intelligent Internet technology (IT) services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing IT and various industries.

Hence, various attempts are made to apply the 5G communication system to the IoT network. For example, 5G communication techniques such as sensor network, M3M, and MTC are implemented by schemes such as beamforming, MIMO, and array antenna. The above-mentioned application of the cloud radio access network as the big data processing technique may be an example of the convergence of the 5G technology and the IoT technology.

Currently, in many studies related to the MIMO-NOMA, combination with a precoder is conducted in power allocation, terminal clustering, open-loop, and closed-loop environments. However, researches on a diversity gain of a multi-antenna exhibiting high efficiency at a lower signal to interference and noise ratio (SINR) are not specifically carried out, also did not consider a method for selectively utilizing the above-mentioned measures.

SUMMARY

As discussed above, the present disclosure provides an apparatus and a method for communicating in a non orthogonal multiple access scheme using a multi-antenna gain.

According to various embodiments of the present disclosure, an operating method of a base station in a wireless communication system may include determining a transmission mode of the greatest channel capacity among a plurality of transmission modes based on first channel information of a first terminal and second channel information of a second terminal, and transmitting a transmit signal generated based on the determined transmission mode to the first terminal and the second terminal. The first transmission mode of the plurality of the transmission modes may be a transmission mode for applying a diversity scheme to a first signal for the first terminal, applying a multiplexing scheme to a second signal for the second terminal, and transmitting the transmit signal comprising the first signal and the second signal in a non-orthogonal multiple access (NOMA) scheme.

According to various embodiments of the present disclosure, an operating method of a terminal in a wireless communication system may include receiving control information indicating a transmission mode for a transmit signal among a plurality of transmission modes, from a base station, receiving the transmit signal from the base station, and detecting a signal for the terminal from the transmit signal based on the transmission mode, wherein the transmit signal may be generated and transmitted by the base station based on the determined transmission mode, and the first transmission mode of the plurality of the transmission modes may be a transmission mode for applying a diversity scheme to a first signal for one of the terminal and another terminal, applying a multiplexing scheme to a second signal for the other of the terminal and the another terminal, and transmitting the transmit signal in a NOMA scheme.

According to various embodiments of the present disclosure, an apparatus of a base station in a wireless communication system may include a controller and a transmitter, wherein the controller may be configured to determine a transmission mode of the greatest channel capacity among a plurality of transmission modes based on first channel information of a first terminal and second channel information of a second terminal, and to transmit a transmit signal generated based on the determined transmission mode to the first terminal and the second terminal, and the first transmission mode of the plurality of the transmission modes may be a transmission mode for applying a diversity scheme to a first signal for the first terminal, applying a multiplexing scheme to a second signal for the second terminal, and transmitting the transmit signal comprising the first signal and the second signal in a NOMA scheme.

According to various embodiments of the present disclosure, an apparatus of a terminal in a wireless communication system may include a receiver and a controller. The receiver may be configured to receive control information indicating a transmission mode for a transmit signal among a plurality of transmission modes, from a base station, to receive the transmit signal from the base station, and to detect a signal for the terminal from the transmit signal based on the transmission mode, wherein the transmit signal may be generated and transmitted by the base station based on the determined transmission mode, and the first transmission mode of the plurality of the transmission modes may be a transmission mode for applying a diversity scheme to a first signal for one of the terminal and another terminal, applying a multiplexing scheme to a second signal for the other of the terminal and the another terminal, and transmitting the transmit signal in a NOMA scheme.

An apparatus and a method according to various embodiments of the present disclosure may improve channel capacity supported throughout a cell, using non-orthogonal multiple access technology.

Effects obtained from the present disclosure are not limited to the effects mentioned above, and other effects not mentioned may be clearly understood by those skilled in the art of the present disclosure.

BRIEF DESCRIPTION OF THE DRAWINGS

The following detailed descriptions are made by referring to the accompanying drawings for more complete understanding of the present disclosure. The same reference numbers in the drawings indicate like elements.

DETAILED DESCRIPTION

Figure 1:
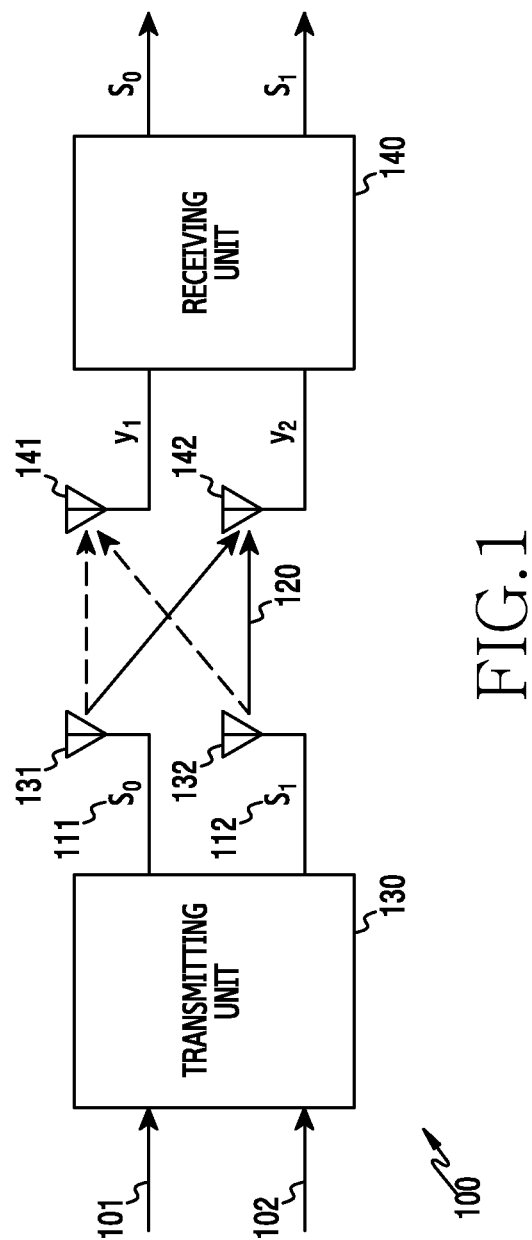
FIG. 1 depicts transmission considering a multiplexing scheme in a multi-antenna system.

Hereinafter, an operational principle of various embodiments is described in detail with reference to the accompanying drawings. In the following explanations, well-known functions or constitutions will not be described in detail if they would unnecessarily obscure the subject matter of the various embodiments. Also, terminologies to be described below are defined in consideration of functions in the various embodiments and may vary depending on a user's or an operator's intention or practice. Thus, their definitions should be defined based on all the contents of the specification.

The terms used in the present disclosure are only used to describe specific embodiments, and are not intended to limit the present disclosure. Singular forms may include plural forms as well unless the context clearly indicates otherwise. All terms used herein, including technical and scientific terms, may have the same meaning as those commonly understood by a person skilled in the art to which the present disclosure pertains. Terms such as those defined in a generally used dictionary may be interpreted to have the meanings equal or similar to the contextual meanings in the relevant field of art, and are not to be interpreted to have ideal or excessively formal meanings unless clearly defined in the present disclosure. In some cases, even a term defined in the present disclosure should not be interpreted to exclude embodiments of the present disclosure.

In various embodiments of the present disclosure to be described below, a hardware approach will be described as an example. However, since the various embodiments of the present disclosure include a technology using both hardware and software, the various embodiments of the present disclosure do not exclude a software-based approach.

Hereinafter, the present disclosure describes a technique for signal transmission in a wireless communication system supporting non orthogonal multiple access (NOMA).

Terms indicating control information, terms indicating multi-antenna signal processing schemes, terms indicating operation status (e.g., mode, event), terms indicating transmit signals, terms indicating network entities, terms indicating messages, and terms indicating components of a device, used in the following, are mentioned for the sake of explanations. Accordingly, the present disclosure is not limited to the terms to be described, and may use other terms having technically identical meaning.

Since the non-orthogonal multiple access (hereinafter, referred to as 'NOMA'.) scheme is known as the best way to obtain a capacitor region for measuring channel capacity of two terminals, it is recently rising as a strong candidate for a new multiple access technique of next generation communication. Since new operations such as clustering a plurality of subsets and differentiating power allocation by including a nearby terminal and a remote terminal, as one subset, based on a base station, are added to enable the NOMA, new researches involved are under way and a 3$^{rd}$ Generation Partnership Project (3GPP) group is working on worldwide studies. Since the multi-antenna is essential to increase communication capacity, it may be most efficient and adequate to utilize the NOMA in an environment including multiple antennas, that is, in a multiple-input multiple-output (MIMO) environment.

Hereafter, the present disclosure explains a technique for acquiring a diversity gain in a wireless communication system which supports the NOMA.

FIG. 1 depicts transmission considering a multiplexing scheme in a multi-antenna system. The multi-antenna system assumes antennas of two transmitting units and antennas of two receiving units, unless mentioned otherwise. A term such as 'portion' or '~er' used in the following indicates a unit for processing at least one function or operation, and may be implemented using hardware, software, or a combination of hardware and software.

Referring to FIG. 1, a multi-antenna system 100 may be a system using multiple antennas spatially separated to a transmitting unit 130 and a receiving unit 140. The multi-antenna system 100 may improve wireless data transmission efficiency such as bit error rate (BER), compared with a conventional single input single output system, which may be achieved by adequately combining all of signals received via radio links between transmit and receive antennas. Hence, wireless communication performance may be greatly improved without using an additional frequency band, but hardware and computational complexity may increase compared to a conventional system.

A data stream 101 and a data stream 102 to transmit are inputted to the transmitting unit 130. The data stream 101 and the data stream 102 may include a symbol 111 and a symbol 112. The symbol 111 may be $s_0$ and the symbol 112 may be $s_1$. The symbol 111 and the symbol 112 may be concurrently transmitted from the transmitting unit 130 to the receiving unit 140. The symbol 111 and the symbol 112 may be part of the data streams 101 and 102 respectively. The transmitting unit 130 may include an antenna 131 and an antenna 132. If the multiplexing scheme is used, the symbol 111 and the symbol 112 may be inputted to the antenna 131 and the antenna 132 respectively. The inputted symbol 111 and the inputted symbol 112 may be transmitted from the antenna 131 and the antenna 132 to the receiving unit 140 over a channel 120.

The receiving unit 140 may include an antenna 141 and an antenna 142. If the multiplexing scheme is used, the antenna 141 and the antenna 142 may divide and receive the symbol 111 and the symbol 112 in consideration of the channel 120. Upon the reception, noise may be included according to a channel environment of the channel 120. If the noise is considerable, the receiving unit 140 may not normally receive the signal. The channel in the multi-antenna system may be expressed with a matrix of a size according to the number of the antennas of the transmitting unit and the number of the antennas of the receiving unit. The channel 120 may be represented by a matrix of size 2×2. Channel status of the multi-antenna system may be expressed by Equation 1.

$$\begin{pmatrix} y_1 \\ y_2 \end{pmatrix} = \begin{pmatrix} h_{11} & h_{12} \\ h_{21} & h_{22} \end{pmatrix} \begin{pmatrix} s_1 \\ s_2 \end{pmatrix} + \begin{pmatrix} n_1 \\ n_2 \end{pmatrix} \quad \text{Equation 1}$$

$y_k$ is a symbol transmitted at a k-th antenna of the receiving unit 140, $s_k$ is a symbol transmitted over a k-th antenna of the transmitting unit 130, and $n_k$ is noise received at the k-th antenna of the receiving unit 140. The noise may differ according to the channel status.

The receiving unit 140 may, after receiving, detect the transmitted symbols by decoding the received symbols. Due to the noise, the receiving unit 140 may have difficult in accurately obtaining the transmitted symbols. That is, depending on the noise, channel gain may be lowered.

Figure 2A:
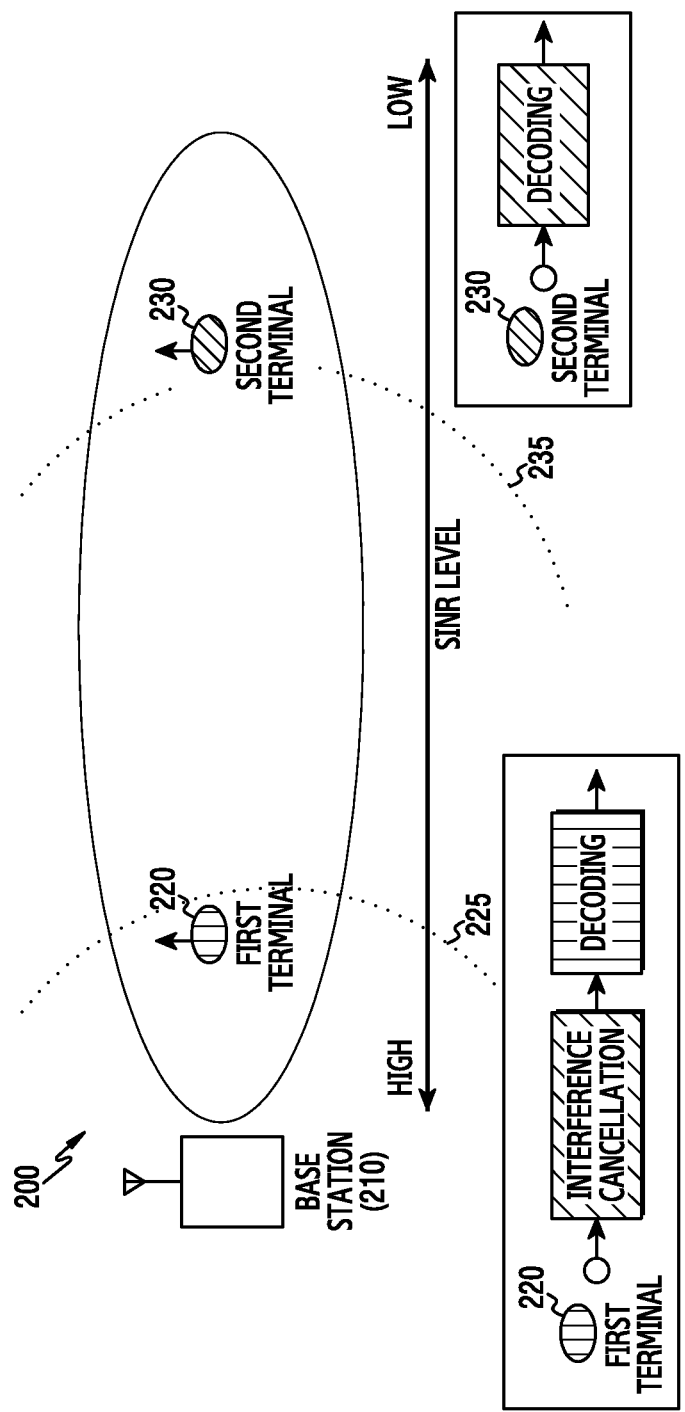
FIG. 2 depicts a non orthogonal multiple access (NOMA) system.
Figure 2B:
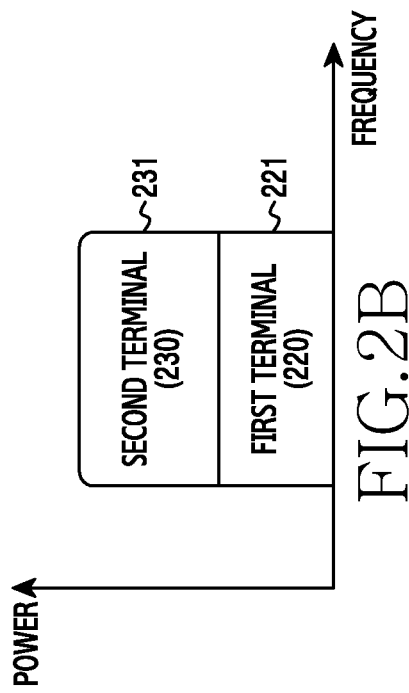

FIG. 2 depicts a NOMA system. FIG. 2A depicts a relationship between a base station and a terminal in the NOMA system. FIG. 2B depicts a relationship between a frequency and power allocated to the terminal in the NOMA system. The NOMA is the technique for improving spectral efficiency by concurrently transmitting data to two or more terminals on the same time, frequency, and space resources. The NOMA system may not necessarily require orthogonality in terms of frequency resource allocation, as required by conventional orthogonal multiple access (OAM), for example, orthogonal frequency division multiple access (OFDMA). Thus, the NOMA system may improve resource efficiency by overlappingly allocating two or more terminals on the same frequency resource at the same time. Due to characteristics of the wireless communication technology which supports more terminals than the antennas in number, the NOMA system may obtain more bandwidths but a signal to noise ratio (SINR) may decrease because of interference increase. Accordingly, in the equation (channel capacity=available bandwidth×log (power/noise power)) of the channel capacity, the coefficient in front of the logarithm may increase but the value of the logarithm may be lowered.

Referring to FIG. 2A, a NOMA system 200 may assume the same frequency environment. The NOMA the system 200 may include two terminals of which channel quality is relatively greatly different from the base station 210. The quality may mean the SINR. The base station 210 may include a terminal 220 and a terminal 230 in its coverage area. The terminal 220 may be located relatively close to the base station 210. The terminal 230 may be located relatively distant from the base station 210. The terminal 230 may be located on a boundary of the coverage area of the base station 210. The base station 210 may overlap data symbols to transmit to the first terminal 220 and data symbols to transmit to the second terminal 230. The base station 210 may transmit the overlapping data symbols to the first terminal 220 and the second terminal 230 in the same frequency and time resources.

A situation where the base station 210 transmits the same signal is assumed. At this time, the terminal 220 is closer than the terminal 230 and accordingly has a relatively higher SINR value than the terminal 230. Since the terminal 220 has the relatively high SINR value, the base station 210 may allocate relatively less power to the terminal 220. Since the SINR value of the terminal 230 is relatively low, the base station 210 may be required to allocate more power to the terminal 230.

According to a successive interference cancellation (SIC) scheme, the terminal 220 may first decode and remove an interference signal regarding the terminal 230 of which a strength is relatively high, from the signal, and then successfully decode its signal. The signal regarding the terminal 220 may serve as the interference signal to the terminal 230. The signal regarding the terminal 220 may arrive at the terminal 230 with a relatively low strength. The terminal 230 may not consider the signal of the terminal 220. Hence, the terminal 230 may successfully decode its signal.

Referring to FIG. 2B, an X axis may indicate the frequency and a Y axis may indicate the power. The first terminal 220 and the second terminal 230 may have the same frequency resource domain. It may be necessary to distinguish a resource 221 allocated to the first terminal 220 and a resource 231 allocated to the second terminal 230, which have the same frequency resource domain. The base station 210 may differently set levels of the power allocated to the terminal 220 and the power allocated to the terminal 230. The power allocated to the terminal 220 may be determined based on the SINR level of the terminal 220. The power allocated to the terminal 230 may be determined based on the SINR level of the terminal 230. Since the terminal 220 has the higher SINR level, the base station 210 may allocate relatively low power to the terminal 220. Since the SINR level of the terminal 230 is high, the base station 210 may allocate relatively more power to the terminal 230. The resource 231 may have more power than the resource 221. The terminal 220, which is not allocate the high power, may accurately determine the received signal because its SINR level is high. That is, the NOMA system may use the allocated power level as the factor for distinguishing the resource.

According to the above-stated NOMA system, BER performance of the terminal distant from the base station may be an issue. The farther from the base station, the worse BER performance of terminals. Hence, a terminal on the cell boundary of the base station may need to improve the performance. The base station may need to allocate the power by considering the channel capacity of the whole cell. The channel capacity of the whole cell may be a sum of the channel capacity of the terminal on the cell boundary and the channel capacity of the terminal inside the cell. A system for increasing the channel capacity of the whole cell and improving the performance of the terminal on the cell boundary may be demanded.

Various embodiments of the present disclosure may represent an algorithm for determining clustering and transmission modes of terminals by defining a new transmission mode using diversity gain and utilizing the transmission mode in the NOMA system. Various embodiments of the present disclosure may include four transmission modes. The four transmission modes may include a first transmission mode and a second transmission mode which are transmission schemes using the diversity gain of the NOMA system, a third transmission mode which is a transmission mode of a conventional NOMA system, and a fourth transmission mode which is a transmission mode of a conventional OMA system.

Figure 3:
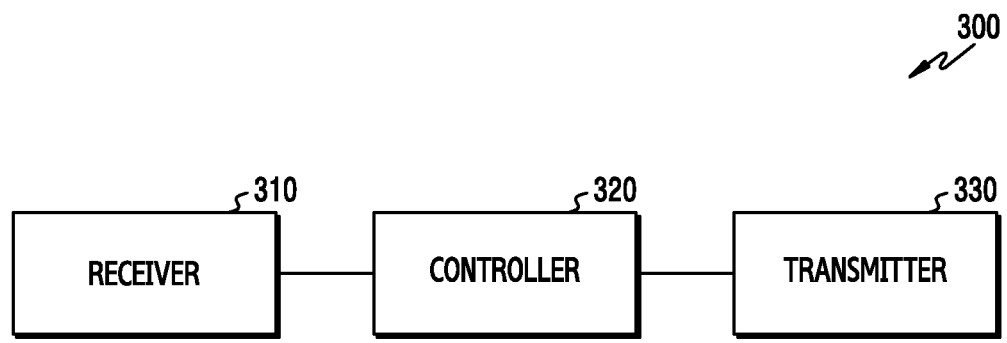
FIG. 3 depicts a functional block configuration of an apparatus according to various embodiments.

FIG. 3 depicts a functional block configuration of an apparatus according to various embodiments.

Referring to FIG. 3, the apparatus 300 may be a base station. According to a network type, other well-known terms, such as a base station or an access point (AP), may be used in place of an evolved Node B (eNodeB or eNB). For convenience, the term eNodeB or eNB may be used to indicate network infrastructure components which provide radio access to remote terminals in this patent application. Also, according to the network type, other well-known terms, such as a mobile station, a subscriber station, a remote terminal, a wireless terminal, or a user device, may be used in place of a user equipment (UE).

The apparatus 300 may include a receiver 310, a controller 320, and a transmitter 330. The receiver 310 may perform functions for transmitting and receiving signals over a radio channel. For example, the receiver 310 may perform a conversion function between a radio frequency (RF) signal and a baseband signal according to a physical layer standard of the system. For example, in data reception, the receiver 310 may receive an RF signal via at least one antenna, process the RF signal, down-convert to a baseband signal, and convert to a digital signal. For example, the receiver 510 may include a receive filter, an amplifier, a mixer, an oscillator, a digital to analog convertor (DAC), an analog to digital convertor (ADC), and so on. If including a plurality of receive antennas, the receiver 510 may include a plurality of RF chains.

The receiver 310 may receive channel information from each of terminals. The channel information may be channel quality indicator (CQI) or channel status information (CSI). The channel information may be used for the power allocation of the terminals.

The controller 320 may use the channel information received through the receiver 310. The controller 320 may determine power levels allocated to the terminals based on the channel information. The controller 320 may calculate a channel capacity in each of transmission schemes (transmission modes). According to the channel information, the controller 320 may determine the transmission scheme of the transmitter 330. Also, the controller 320 may determine the transmission mode of the greatest channel capacity. According to various embodiments of the present disclosure, the transmission scheme may be one of four transmission schemes (transmission modes).

Among the four transmission modes, a first transmission mode is a scheme which transmits, in the NOMA system, using a diversity scheme to the first terminal relatively close to the base station and transmits using the multiplexing scheme to the second terminal relatively remote from the base station. A second transmission mode is a scheme which transmits, in the NOMA system, using the multiplexing scheme to the first terminal relatively close to the base station and transmits using the diversity scheme to the second terminal relatively remote from the base station. A third transmission mode is the conventional NOMA scheme and transmits using the multiplexing scheme to both of the first terminal and the second terminal. A fourth transmission mode is the conventional OMA scheme, and generates transmits a signal satisfying the orthogonality for the terminals.

The controller 320 may determine the transmission mode based on a sum of the channel capacities of the terminals. Also, the controller 320 may generate a signal to transmit based on the channel information and the determined transmission mode. The generated signal may be the signal to transmit from the transmitter 320 to the terminals. The controller 320 may obtain a diversity gain or a multiplexing gain using the generated signal. The controller 320 may generate the signal based on the power allocated to each of the terminals.

The transmitter 330 may transmit the signal generated through the controller 320, to the terminals. The transmitter 330 may transmit the signal to the terminals according to the determined transmission mode. The first transmission mode, the second transmission, and the third transmission are the transmission schemes of the NOMA system, and accordingly the apparatus 300 may transmit data transmitted to each of the terminals in the same time and the same frequency resource domains. The data may be part of the generated signal. Hence, the transmitter 330 may transmit the generated signal to the terminals at one time. Herein, transmitting at one time means that the transmitter 330 transmits the generated signal to each of the terminals in a resource allocation unit (hereafter, a resource unit (RU)).

In the fourth transmission mode, which is the transmission scheme of the OMA system, the transmitter 330 may transmit data transmitted to each of the terminals in different time or different frequency resource. The data may be independent. Accordingly, the generated signal may be a signal regarding only a particular terminal of the terminals. Signals may be generated for the terminals respectively. Since the signals satisfy the orthogonality, they may not greatly affect communication performance between the terminals and the base station.

According to various embodiments of the present disclosure, the apparatus 300 may transmit the signal over the same frequency resource and time resource. This is because the power may be the factor for distinguishing the resource in the environment supporting the NOMA system. Hence, the generated signal may be transmitted to the terminals in the same frequency resource and the same time resource. The terminals may transmit the signal and then identify other signals than its own signal as interference.

Figure 4:
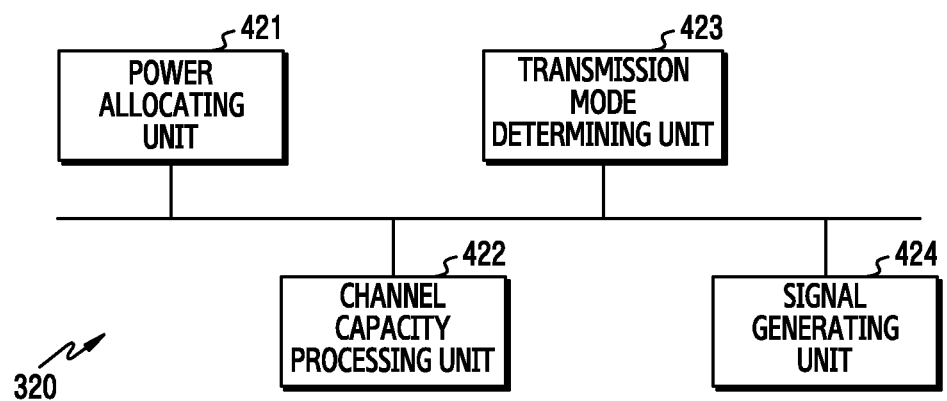
FIG. 4 depicts a functional block configuration of a controller according to various embodiments.

FIG. 4 depicts a functional block configuration of a controller according to various embodiments. The controller may be the controller 320 of FIG. 3. The controller 320 may include a power allocating unit 421, a channel capacity processing unit 422, a transmission mode determining unit 423, and a signal generating unit 424.

The power allocating unit 421 may determine power levels allocated to terminals based on the channel information. The power allocating unit 421 may obtain a channel gain of each of the terminals from the channel information. The power allocating unit 421 may determine a power allocation of each of the terminals in inverse proportion to the obtained channel gain. That is, the power allocating unit 421 may allocate low power to a terminal having the great channel gain. The power allocating unit 421 may allocate high power to a terminal having the small channel gain. The power allocating unit 421 may use a fractional transmit power allocation (FTPA) power allocation scheme to allocate the power to the terminal. Using the FTPA allocation scheme, the power allocating unit 421 may set a power allocation coefficient based on the channel gains of the terminals. The power allocating unit 421 may allocate the powers of the terminals through superposition coding.

The channel capacity processing unit 422 may calculate the channel capacity in each of transmission modes. The transmission modes may include a first transmission mode, a second transmission mode, a third transmission mode, and a fourth transmission mode.

The first transmission mode is a scheme which transmits, in the NOMA system, using the diversity scheme to a first terminal relatively close to a base station and transmits using the multiplexing scheme to a second terminal relatively remote from the base station. The second terminal may be the terminal on a boundary of a coverage area of the base station. The first terminal, which is close to the base station, may be allocated relatively low power, and the second terminal, which is remote from the base station, may be allocated relatively high power. The first terminal may enable smooth communication even if the low power is allocated. The channel capacity of the whole cell in the first transmission mode may be derived from Equation 2 through Equation 10.

$$R_1 = \sum_{i=1}^{2} \log_2\left(1 + \frac{|U_f(i,i)|^2 P_f}{|wn_f(i)|^2 + \sum_{k=1, k \neq i}^{2} |U_f(i,i)|^2 P_f + \sum_{k=1}^{2} |U_f(i,k)|^2 P_n}\right) + \quad \text{Equation 2}$$

$$(1 - BLER^{MCS_f} \mid SINR_{SIC}) \times \frac{1}{2}$$

$$\sum_{i=1}^{2} \log_2\left(1 + \frac{\sum_{x,y=1}^{2} |G_n(x,y)|^2 P_n}{\sum_{k=1}^{4} |RN(i,k)|^2}\right)$$

$$W_n = ((H_n F_n)^\dagger H_n F_n + \sigma_n I)^{-1}(H_n F_n)^\dagger \quad \text{Equation 3}$$

$$W_f = ((H_f F_f)^\dagger H_f F_f + \sigma_n I)^{-1}(H_f F_f)^\dagger \quad \text{Equation 4}$$

$$U_n = W_n H_n F_n \quad \text{Equation 5}$$

$$U_f = W_f H_f F_f \quad \text{Equation 6}$$

$$wn_n = W_n n_n \quad \text{Equation 7}$$

$$wn_f = W_f n_f \quad \text{Equation 8}$$

$R_1$ is the channel capacity in the first transmission mode, W is a mini-mental state examination (MMSE) equalizer filter, F is a precoder, $\sigma_n$ is noise power, wn is noise passed through the equalizer filter, $P_f$ is the power allocated to the remote terminal, and $P_n$ is the power allocated to the nearby terminal.

$$RN(1,:) = [G_n(1,1)^\dagger n_{n,1}(1), G_n(2,1) n_{n,1}^\dagger(2), G_n(1,2)^\dagger n_{n,2}(1), G_n(2,2)^\dagger n_{n,2}(2)] \quad \text{Equation 9}$$

$$RN(2,:) = [-G_n(1,1) n_{n,1}^\dagger(2), G_n^\dagger(2,1) n_{n,1}(1), -G_n(1,2) n_{n,2}^\dagger(2), G_n^\dagger(2,2) n_{n,2}(1)] \quad \text{Equation 10}$$

In Equations, $n_{n,1}$, $n_{n,2}$ are noise vectors of time intervals respectively. In Equations, $P_n$ may be the power allocated to the first terminal. In Equations, $P_f$ may be the power allocated to the second terminal. If calculating the channel capacity to the first terminal, the channel capacity processing unit 422 may define $G_n = H_n F_n$. If calculating the channel capacity to the first terminal, the channel capacity processing unit 422 may include multiplying one half because two time intervals are used. Based on Equation 2, the channel capacity processing unit 422 obtains full-diversity gain and accordingly may include the power sum of the channel gain into the numerator when calculating the channel capacity to the first terminal. The channel capacity processing unit 422 may include the noise into the denominator when calculating the channel capacity to the first terminal. The channel capacity to the second terminal may be calculated in the same manner as the third transmission mode to be described. Specific equations shall be explained.

Since the first terminal is relatively close to the base station, the first terminal may receive, in a state sufficient to decode a second signal regarding the second terminal together with a first signal regarding the first terminal them. To remove the second signal, the first terminal may perform the SIC. In this case, the signal of the second terminal remote from the base station is removed, but, if removed wrong, an SIC error may occur. By considering the SIC error occurrence, the channel capacity processing unit 422 may regard the channel capacity as zero and include multiplying 1-BELR before the equation of the first channel capacity. $MCS_f$ may denote a modulation and coding scheme (MCS) of the second terminal, and $SINR_{SIC}$ may denote the SINR when the first terminal performs the SIC. The first terminal may decode and remove the signal of the second terminal in the SIC.

The second transmission mode is a scheme which transmits, in the NOMA system, using the multiplexing scheme to the first terminal relatively close to the base station and transmits using the diversity scheme to the second terminal relatively remote from the base station. The second terminal may be the terminal on the boundary of the coverage area of the base station. The first terminal, which is remote from the base station, may be allocated relatively high power, and the first terminal, which is close to the base station, may be allocated relatively low power. The first terminal may enable smooth communication even if the low power is allocated. The channel capacity of the whole cell in the second transmission mode may be expressed as Equation 11 through Equation 12.

$$R_2 = \left(1 - BLER^{MCS_f}\big|_{SINR_{SIC}}\right) \times$$

$$\sum_{i=1}^{2}\left(1 + \frac{|U_n(i,i)|^2 P_n}{|wn_n(i)|^2 + \sum_{k=1, k \neq i}^{2}|U_n(i,k)|^2 P_n}\right) +$$

$$\log_2\left(1 + \frac{\sum \sum_{x,y=1}^{2}|U_M(x,y)|^2 P_f}{\sum \sum_{x,n=1}^{2}|U_M(x,y)|^2 P_n + \sum_{k=1}^{2}|wn_f(k)|^2}\right)$$

Equation 11

$R_2$ is the channel capacity in the second transmission mode, W is the MMSE equalizer filter, F is the precoder, $\sigma_n$ is the nose power, wn is the noise passing through the equalizer filter, $P_f$ is the power allocated to the remote terminal, and $P_n$ is the power allocated to the nearby terminal.

$$U_M = H_f^\dagger H_f F_f$$

Equation 12

In Equation 11, $P_n$ may be the power allocated to the first terminal, and $P_f$ may be the power allocated to the second terminal. Equation 11 may refer to Equations 2 through 10. In the second transmission mode, the first terminal may obtain the diversity gain. The channel capacity to the first terminal may be the same as the third transmission mode to be described.

Since the first terminal is relatively close to the base station, the first terminal may receive, in a state sufficient to decode a second signal regarding the second terminal together with a first signal regarding the first terminal together, them. To remove the second signal, the first terminal may perform the SIC. In this case, the signal of the second terminal remote from the base station is removed, but, if removed wrong, an SIC error may occur. By considering the SIC error occurrence, the channel capacity processing unit 422 may regard the channel capacity as zero and include multiplying 1−BELR before the equation of the first channel capacity. $MCS_f$ may denote the MCS of the second terminal, and $SINR_{SIC}$ may denote the SINR when the first terminal performs the SIC. As in the first transmission mode, the second transmission mode may vary an actual transmission value, that is, the channel capacity because the power allocation varies. The first terminal in the SIC may decode and remove the second signal.

The second terminal, which receives one signal in one time interval and uses a matched filter (MF) for doing so, may include power to be allocated, interference power of the first terminal, and noise power.

The third transmission mode is a scheme which transmits, in the NOMA system, using the multiplexing scheme to both of the first terminal and the second terminal. The second terminal may be the terminal in the boundary of the coverage area of the base station. The first terminal, which is close to the base station, may be allocated relatively high power, and the second terminal, which is remote from the base station, may be allocated relatively low power. The first terminal may enable smooth communication even if the low power is allocated. The channel capacity of the whole cell in the third transmission mode may be expressed as Equation 13.

$$R_3 = \left(1 - BLER^{MCS_f}\big|_{SINR_{SIC}}\right) \times$$

$$\sum_{i=1}^{2}\log_2\left(1 + \frac{|U_n(i,i)|^2 P_n}{|wn_n(i)|^2 + \sum_{k=1, k \neq i}^{2}|U_n(i,k)|^2 P_n}\right) +$$

$$\sum_{i=1}^{2}\log_2\left(1 + \frac{|U_f(i,i)|^2 P_f}{|wn_f(i)|^2 + \sum_{k=1, k \neq i}^{2}|U_f(i,k)|^2 P_f + \sum_{k=1}^{2}|U_f(i,k)|^2 P_n}\right)$$

Equation 13

$R_3$ is the channel capacity in the third transmission mode, W is the MMSE equalizer filter, F is the precoder, $\sigma_n$ is the nose power, wn is the noise passing through the equalizer filter, $P_f$ is the power allocated to the remote terminal, and $P_n$ is the power allocated to the nearby terminal.

In Equation 13, $P_n$ may be the power allocated to the first terminal, and $P_f$ may be the power allocated to the second terminal. Equation 12 may refer to Equations 2 through 10. In the third transmission mode, both of the first terminal and the second terminal may obtain the diversity gain.

The first terminal, which is relatively close to the base station, may receive, in a state sufficient to decode a second signal regarding the second terminal together with a first signal regarding the first terminal, them. To remove the second signal, the first terminal may perform the SIC. In this case, the signal of the second terminal remote from the base station is removed, but, if removed wrong, an SIC error may occur. By considering the SIC error occurrence, the channel capacity processing unit 422 may regard the channel capacity as zero and include multiplying 1−BELR before the equation. $MCS_f$ may denote the MCS of the second terminal, and $SINR_{SIC}$ may denote the SINR when the first terminal performs the SIC. The first terminal in the SIC may decode and remove the signal of the second terminal.

In the fourth transmission mode, in the OMA system, the base station may transmit a signal at a frequency satisfying the orthogonality for each of terminals. It may be obtained by merely by adding transmission rates of the terminals. Each transmission rate may include an intended signal strength, a noise strength, and an interference strength. The fourth transmission mode may, which uses time slots two times more unlike the NOMA system, may divide the added value by two.

This may be expressed as Equation 14.

$$R_4 = \frac{1}{2}\left[\sum_{i=1}^{2}\log_2\left(1 + \frac{|U_n(i,i)|^2}{|wn_n(i)|^2 + \sum_{k=1, k \neq i}^{2}|U_n(i,k)|^2}\right) + \sum_{i=1}^{2}\log_2\left(1 + \frac{|U_f(i,i)|^2}{|wn_f(i)|^2 + \sum_{k=1, k \neq i}^{2}|U_f(i,k)|^2}\right)\right]$$

Equation 14

$R_4$ is the channel capacity in the fourth transmission mode, W is the MMSE equalizer filter, F is the precoder, $\sigma_n$ is the nose power, wn is the noise passing through the equalizer filter, $P_f$ is the power allocated to the remote terminal, and $P_n$ is the power allocated to the nearby terminal.

In Equation 14, $P_n$ may be the power allocated to the first terminal, and $P_f$ may be the power allocated to the second terminal. Equation 14 may refer to Equations 2 through 10. The first terminal and the second terminal may obtain the multiplexing gain. In the operations of the OMA system, the signals transmitted to the first terminal and the second terminal may correspond to different frequency resources. That is, the SIC operation may not be needed, like the first transmission mode, the second transmission mode, and the third transmission mode.

The channel capacity of each of the transmission modes may indicate the total channel capacity of the terminals inside the cell based on the cell of the base station. The terminals may include the first terminal and the second terminal.

The transmission mode determining unit 423 may determine the transmission mode of the greatest channel capacity.

Based on the power allocated to the terminals and the channel information, the transmission mode of the greatest channel capacity may be determined from the multiple transmission modes. Information indicating the determined transmission mode may be expressed with 2-bit information. The 2-bit information may represent four cases. The four cases may include the first transmission mode, the second transmission mode, the third transmission mode, and the fourth transmission mode.

The signal generating unit 424 may generate a signal according to the transmission mode determined at the transmission mode determining unit 423. A signal to transmit to the first terminal may be referred to as a first signal, and a signal to transmit to the second terminal may be referred to as a second signal. Power to allocate to the first terminal may be referred to as first power, and power to allocate to the second terminal may be referred to as second power. The signal may be generated based on the first signal, the second signal, the first power, and the second power. Since the first transmission mode, the second transmission mode, and the third transmission mode correspond to the non-orthogonal NOMA system, levels of the first power and the second power may differ. The first power of the first terminal close to the base station may be set to be low, and the second power of the second terminal remote from the base station may be set to be high.

If the determined transmission mode is the first transmission mode, the first signal may be generated using the diversity scheme. Multiplexed signals inputted through a transmission medium under a radio channel may be adjusted inadequately and thus be subject to serious signal distortion due to signal attenuation and interference of other terminals. To overcome such a problem, the diversity method may be considered. The diversity scheme according to various embodiments of the present disclosure may indicate antenna diversity. Since it is the operation at the transmitter, it may be referred to as transmit diversity. It is the scheme for producing a receive diversity effect using multi-antenna at the base station, and may be suitable for downlink where the receive diversity is generally hard to obtain.

According to various embodiments of the present disclosure, the diversity scheme may be a space-time block coding (STBC) scheme. Communication resources may be divided into time and antenna (space). According to the STBC scheme, it may be transmitted using two symbols in two time intervals. Overlapping transmit symbols transmitted for operations of the NOMA system may be defined according to the time interval. Over multiple antennas in one time interval, it may be transmitted to the first terminal using a complex value or a negative value of one symbol of two symbols and the other symbol of the two symbols. For example, if a first antenna of the transmitter in a first time interval transmits $s_0$ and a second antenna transmits $s_1$, the first antenna of the transmitter in a second time interval may transmit $-s_1^*$ and the second antenna may transmit $s_0^*$. A receiver at the terminal may select, combine, and receive the symbol of less fading by use of the antennas of the receiver. The terminal may obtain the original symbols $s_0$ and $s_1$. The STBC scheme may obtain the diversity gain if channel characteristics do not change during the transmission of the two symbols. The terminal may achieve the space/time diversity gain without additional bandwidth increase, by means of the simple coding using the STBC scheme in the multi-antenna system.

The second signal may be generated using the multiplexing scheme. The second signal may be divided into a plurality of data streams, and then transmitted over a plurality of transmit/receive antennas. The multiplexing scheme, which uses the multiple transmit/receive antennas, may increase the channel capacity without having to increase the frequency bandwidth and the transmit power.

The signal generating unit 424 may generate a signal to be transmitted to the terminals based on the generated first signal and the generated second signal. The signal may be generated to be transmitted on the same time resource and the same frequency resource. In the NOMA system, the signal generating unit 424 may generate the signal by varying the levels of the first power corresponding to the first signal and the second power corresponding to the second signal so that the terminals identify the first signal and the second signal. The signal generating 424 may generate the second signal using the multiplexing scheme. The signal generating unit 424 may divide the second signal into a specific size. The signal generating unit 424 may send the divided second signals to the transmitter 330 of FIG. 3. The transmitter 330 may transmit the divided second signal portions to the second terminal via the multiple antennas. The apparatus 300 of FIG. 3 may achieve efficiency in terms of the transmission time by use of the multiple antennas.

If the determined transmission mode is the second transmission mode, the first signal may be generated using the multiplexing scheme. The first signal may be the same as the second signal transmission scheme, that is, the multiplexing scheme of the first transmission mode. That is, in the first transmission mode, it may be the same as the multiplexing scheme applied to the second terminal which is remote from the base station In the second transmission mode, the second signal may be generated using the diversity scheme. The diversity scheme may refer to antenna diversity. According to various embodiments, the apparatus may obtain the diversity gain by repeatedly transmitting the same symbol over the antennas. The apparatus may improve the communication performance thanks to the obtained diversity gain.

If the determined transmission mode is the third transmission mode, both of the first signal and the second signal may be generated using the multiplexing scheme. The first signal may be the generation scheme of the second signal in the first transmission mode. The second signal may be the generation scheme of the first signal in the second transmission mode.

The signal generating unit 424 may generate the signal to transmit to the terminals based on the generated first signal and second signal. In the first transmission mode, the second transmission mode, and the third transmission mode, the signal generating unit 424 may generate the signal to transmit in the same time resource and the same frequency resource. In the NOMA system, the signal generating unit 424 may allocate different levels of the power allocated to the first signal and the second signal so that the terminals identify the first signal and the second signal. That is, the apparatus 300 may vary the levels of the first power corresponding to the first signal and the second power corresponding to the second signal.

If the determined transmission mode is the fourth transmission mode, both of the first signal and the second signal may be generated according to the transmission scheme of the OMA system. Since it is not the NOMA system as in the first transmission mode, the second transmission mode, and the third transmission mode, different first power and second power may not be allocated. The first signal and the second signal may correspond to different time resources or different frequency resources satisfying the orthogonality respectively.

The signal generating unit 424 may send the generated signal to the transmitter. The transmitter may be the transmitter 300 of FIG. 3.

Figure 5:
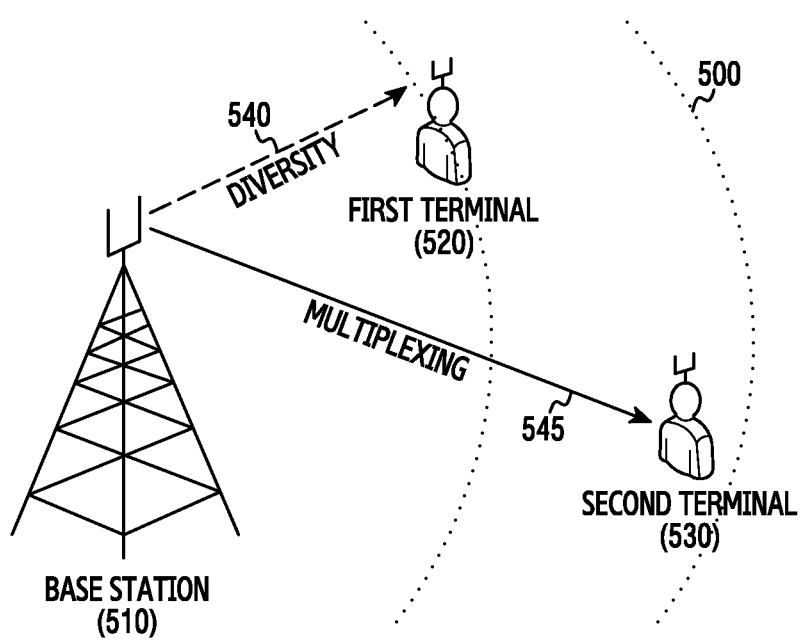
FIG. 5 depicts an example of a radio environment in a first transmission mode according to various embodiments.

FIG. 5 depicts an example of a radio environment in a first transmission mode according to various embodiments. A cell 500 may include a base station 510, a first terminal 520, and a second terminal 530.

Referring to FIG. 5, transmission operations of the base station 510 to the first terminal 520 and the second terminal 530 in a first transmission mode are shown. The first transmission mode is the scheme which transmits, in the NOMA system, a first signal using the diversity scheme to the first terminal 520 relatively close to the base station 510 and transmits a second signal using the multiplexing scheme to the second terminal 530 relatively remote from the base station 510. A transmission system 540 may be the diversity scheme, and a transmission scheme 545 may be the multiplexing scheme. The first signal corresponding to the transmission system 540 and the second signal corresponding to the transmission system 545 may be transmitted on the same time and same frequency resource domains.

The base station 510 may receive channel information from the first terminal 520 and the second terminal 530. The channel information may be CQI or CSI. The channel information may include channel gain.

In the first transmission mode, the base station 510 may generate symbols corresponding to the first signal using the STBC technique and thus transmit the first signal to the first terminal 520 relatively close to the base station 510. In the first transmission mode, the base station 510 may divide the second signal into a plurality of data streams and transmit the second signal to the second terminal 530 which is relatively remote from the base station 510. Using the first transmission mode of the NOMA system, the base station 510 may efficiently transmit the signal to the terminals even in an environment where the SINR of the terminals is not sufficient.

The first terminal 520 may receive not only first signal but also the second signal. For example, it is assumed that the base station 510 transmits data including the first signal and the second signal over a beam of a wide beamwidth. The first terminal 520 and the second terminal 530 may be included in a sector corresponding to the wide beamwidth. The first terminal 520 located close to the base station 510 may remove the second signal according to the SIC scheme. After removing the second signal, the first terminal 520 may detect the first signal. For example, the first signal and the second signal may be detected through an MMSE receive filter.

The second terminal 530 may receive not only the second signal but also the first signal. The farther from the base station, the weaker signal strength, and accordingly the first signal received at the second terminal 530 may be weaker than the second signal in the signal strength. Hence, the second terminal 530 may easily remove the first signal. Alternatively, the second terminal 530 may decode the second signal, without considering the first signal. The second terminal 530 may detect the second signal. For example, the first signal and the second signal may be detected through the MMSE receive filter. The second terminal may detect the second signal using maximum likelihood detection (MLD).

Figure 6:
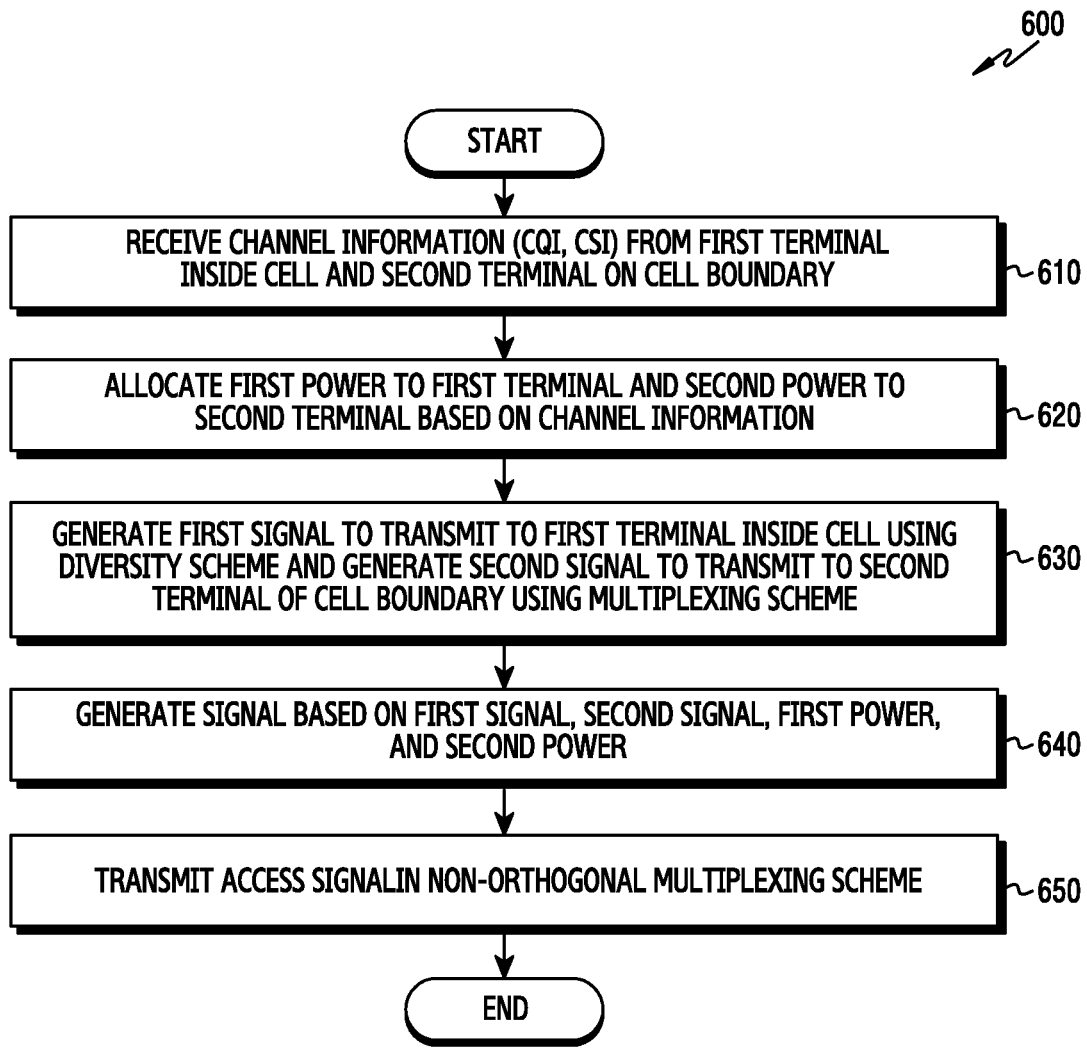
FIG. 6 depicts a flowchart of a base station in a first transmission mode according to various embodiments.

FIG. 6 depicts a flowchart of a base station in a first transmission mode according to various embodiments. The first transmission mode is the scheme which transmits, in the NOMA system, using the diversity scheme to a first terminal relatively close to a base station and transmits using the multiplexing scheme to a second terminal relatively remote from the base station.

Referring to FIG. 6, in step 610, first channel information may be received from the first terminal which is close to the base station. The first terminal may be located inside a cell of the base station. Second channel information may be received from the second terminal which is remote from the base station. The second terminal may be located in a cell boundary of the base station. The first channel information and the second channel information each may include CQI or CSI. The first channel information and the second channel information each may include channel gain. The channel gains may be factors for determining the power levels allocated to the first terminal and the second terminal in the NOMA system.

In step 620, based on the channel information, the base station may allocate first power to the first terminal and second power to the second terminal. The base station may obtain channel gains of the terminals from the channel information. The base station may determine power allocations of the terminals (e.g., the first terminal, the second terminal) in inverse proportion to the obtained channel gains. If the channel gain of the first terminal is great, the base station may allocate low power to the first terminal. This is because, for the great channel gain, the base station may maintain constant performance and enable the communication with the low power. The performance may be expressed as a bit error rate (BER). To allocate the first power and the second power, the base station may use the FTPA power allocation scheme. If the base station uses the FTPA allocation scheme, the base station may set a power allocation coefficient to reflect on the first terminal and the second terminal respectively, based on the channel gains of the first terminal and the second terminal. The base station may allocate the first power and the second power to the first terminal and the second terminal respectively through the superposition coding. In the following, the first terminal refers to the terminal relatively close to the base station, and the second terminal refers to the terminal relatively remote from the base station.

In the NOMA system, since the first terminal and the second terminal receive the signal in the same time and same frequency resources, different power allocations are required to identify the first signal to transmit to the first terminal and the second signal to transmit to the second terminal. As the difference between the first power and the second power increases, the effect of utilizing the NOMA system may improve. According to various embodiments of the present disclosure, the base station may maximize the effect of utilizing the NOMA system by differently allocating the first power and the second power, though a difference between a signal-to-noise ratio (SNR) of the first terminal and the SNR of the second terminal is not considerable.

In step 630, the base station may generate a first signal to be transmitted to the first terminal and a second signal to be transmitted to the second terminal. In the NOMA system, the base station may generate the first signal of the first terminal using the diversity scheme. The base station may generate the second signal of the second terminal by using the multiplexing scheme. In some embodiments, the diversity scheme is the STBC scheme. The base station may increase a total channel capacity supporting the entire cell for a certain time duration, compared with the conventional OMA system or the conventional system NOMA system. The second terminal may be on the cell boundary. The base station may increase the channel capacity of the second terminal.

In step 640, the base station may generate a first transmit signal based on the first signal, the second signal, the first power, and the second power. The first transmit signal may be derived from Equation 15.

$$s=\sqrt{P_1}\cdot s_1+\sqrt{P_2}\cdot s_2 \quad \text{Equation 15}$$

s is the first transmit signal, $P_1$ is the first power, $P_2$ is the second power, $s_1$ is the first signal, and $s_2$ is the second signal. The base station may generate the first signal based on the diversity scheme in the NOMA system. The base station may generate the second signal based on the multiplexing scheme in the NOMA system.

The first transmit signal is a signal according to the first transmission mode, and the base station may vary the levels of the first power and the second power. The base station may allocate relatively low first power of the first terminal. The base station may allocate relatively high second power of the second terminal.

In step 650, the base station may transmit the generated first transmit signal to the first terminal and the second terminal. The first transmission signal is the signal according to the first transmission mode and thus may be the signal based on the NOMA system. The signal may include the first signal and the second signal. The first signal may include symbols generated using the diversity scheme. The second signal may include symbols generated the multiplexing scheme. Accordingly, the base station may transmit the first transmit signal in the same frequency resource and the same time resource. The base station may transmit the first transmit signal using the NOMA scheme. The base station may transmit the first transmit signal using a high MCS level.

Figure 7:
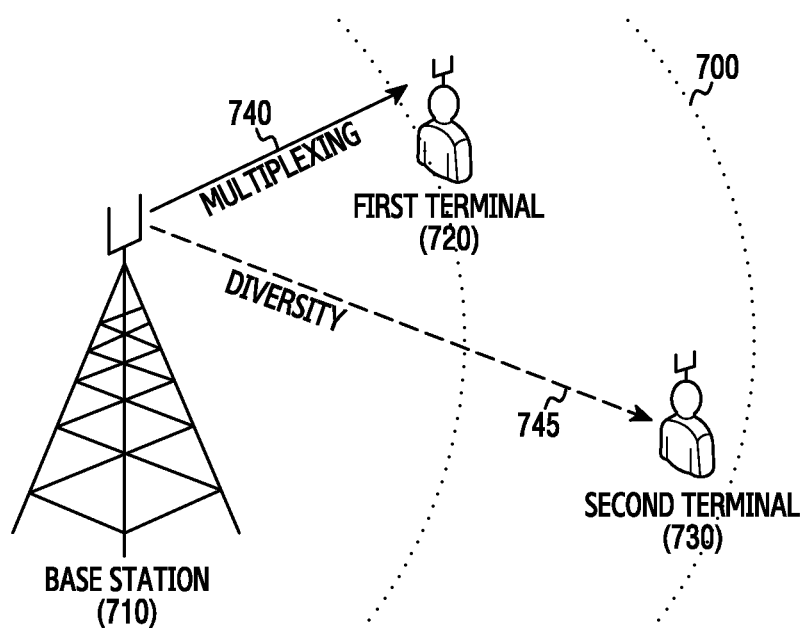
FIG. 7 depicts an example of a wireless environment in a second transmission mode according to various embodiments.

FIG. 7 depicts an example of a wireless environment in a second transmission mode according to various embodiments. A cell 700 may include a base station 710, a first terminal 720, and a second terminal 730.

Referring to FIG. 7, transmission operations of the base station 710 to the first terminal 720 and the second terminal 730 in the second transmission mode are shown. The second transmission mode is the scheme which, in the NOMA system, transmits using the multiplexing scheme to the first terminal 720 relatively close to the base station 710 and transmits using the diversity scheme to the second terminal 730 relatively remote from the base station 710. A transmission system 740 may be the multiplexing scheme, and a transmission scheme 745 may be the diversity scheme. The first signal corresponding to the transmission system 740 and the second signal corresponding to the transmission system 745 may be transmitted on the same time and same frequency resource domains.

The base station 710 may receive channel information from the first terminal 720 and the second terminal 730. The channel information may be CQI or CSI. The channel information may include channel gain.

The base station 710 in the second transmission mode may transmit the first signal by dividing the first signal into a plurality of data streams. The base station 710 in the second transmission mode may transmit the second signal to the second terminal 730 to take advantage of the diversity gain. Using the second transmission mode, the base station 710 may efficiently transmit the signal to the terminals even in an environment where the SINR of the terminals is not sufficient.

The first terminal 720 may receive not only first signal but also the second signal. For example, it may be assumed that the base station 710 transmits the signal by beamforming a sector covering both of the first terminal 720 and the second terminal 730. Alternatively, for example, it may be assumed that the base station 710 transmits the signal in all directions. The first terminal 720 may remove the second signal according to the SIC scheme. The first terminal 720 may, after removing the second signal, detect the first signal. The first signal may include a plurality of symbols. The first terminal 720 may obtain symbols as many as antennas of the base station per time resource unit (e.g., subframe).

The second terminal 730 may receive not only the second signal but also the first signal. Since the second terminal 730 is remote from the base station, the first signal may significantly decrease in strength during the transmission to the second terminal through a wireless communication environment. The farther from the base station, the weaker signal strength, and accordingly the second signal received at the second terminal 730 may be weaker than the first signal in the signal strength. Hence, the second terminal 730 may easily remove the first signal. Alternatively, the second terminal 730 may detect the second signal, without considering the first signal. The second terminal 730 may detect the second signal. In the second transmission mode, the base station 710 may redundantly transmit the first signal and the second signal to the first terminal 720 and the second terminal 730. The base station 710 may obtain the diversity gain by transmitting the second signal to the second terminal 730. If the SINR level of the second terminal is not high, the base station may use the second transmission mode.

Figure 8:
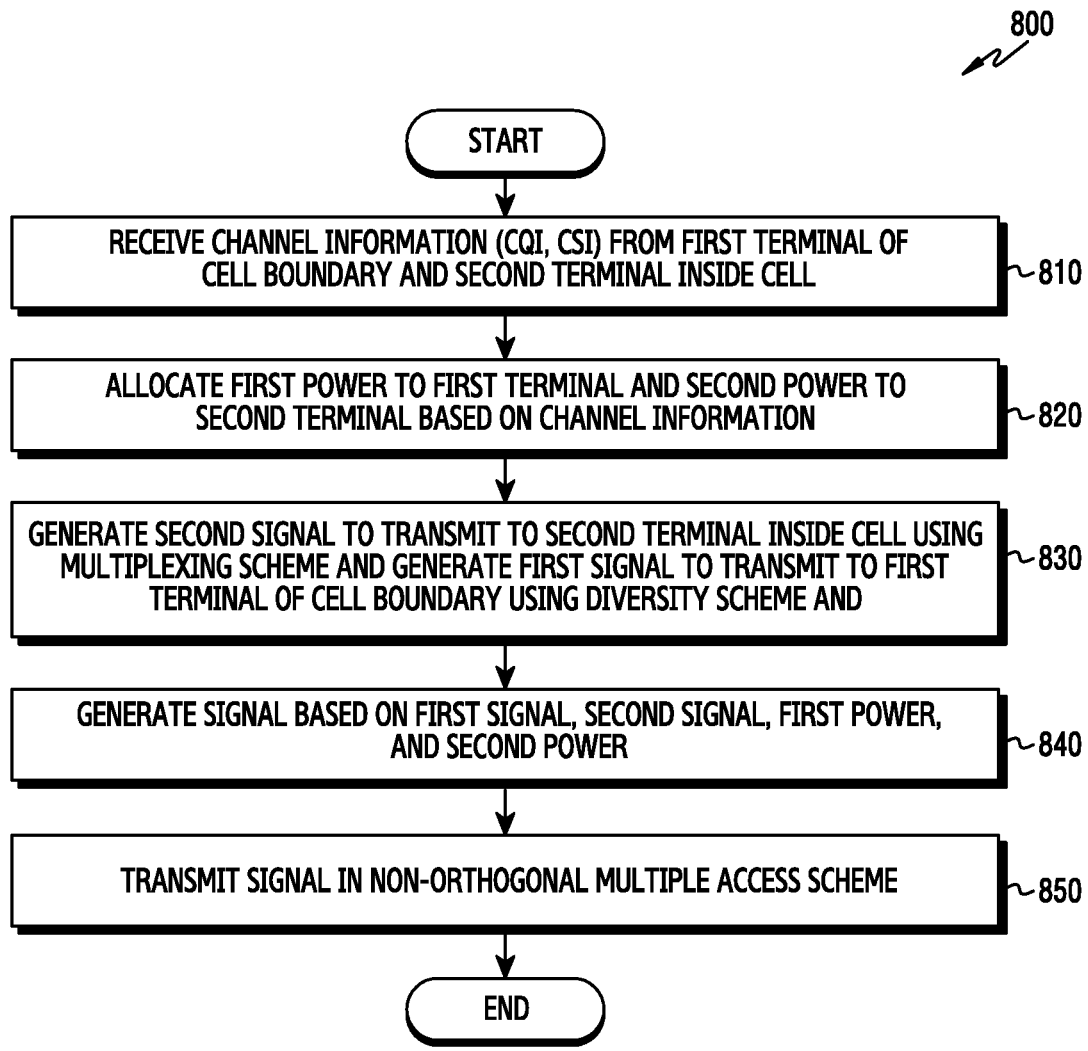
FIG. 8 depicts a flowchart of a base station in a second transmission mode according to various embodiments.

FIG. 8 depicts a flowchart of a base station in a second transmission mode according to various embodiments. The second transmission mode is the scheme which, in the NOMA system, transmits using the multiplexing scheme to a second terminal relatively close to a base station and transmits using the diversity scheme to a first terminal relatively remote from the base station.

Referring to FIG. 8, in step 810, first channel information may be received from the first terminal which is remote from the base station. The first terminal may be located on a cell boundary of the base station. Second channel information may be received from the second terminal which is close to the base station. The second terminal may be located inside the cell of the base station. The channel information may include CQI or CSI. The channel information may include channel gain. The channel gain may be a factor for determining levels of power allocated to the first terminal and power allocated to the second terminal in the NOMA system.

In step 820, based on the channel information, the base station may allocate first power to the first terminal and second power to the second terminal. The base station may obtain channel gains of the terminals from the channel information. The base station may determine power allocations of the terminals (e.g., the first terminal, the second terminal) in inverse proportion to the obtained channel gains. The terminals may include the first terminal and the second terminal. If the channel gain of the first terminal is small, the base station may allocate high power to the first terminal. With small channel gain, the base station may require relatively high power to guarantee constant performance and to enable the communication. The performance may be expressed as the BER. To allocate the first power and the second power, the base station may use the FTPA power allocation scheme. If the base station uses the FTPA allocation scheme, the base station may set a power allocation coefficient based on the channel gains of the first terminal and the second terminal. The base station may allocate the first power and the second power through the superposition coding. In the following, the first terminal refers to the terminal relatively close to the base station, and the second terminal refers to the terminal relatively remote from the base station.

In the NOMA system, since the first terminal and the second terminal receive in the same time and same frequency resources, different power allocations are required to identify the first signal to transmit to the first terminal and the second signal to transmit to the second terminal. As the level difference between the first power and the second power increases, the effect of utilizing the NOMA system may improve. Also, according to various embodiments of the present disclosure, if a difference between the SNR of the first terminal and the SNR of the second terminal is not great, the base station may maximize the effect of utilizing the NOMA system by differently allocating the first power and the second power.

In step 830, the base station may generate a first signal to be transmitted to the first terminal and a second signal to be transmitted to the second terminal. In the NOMA system, the base station may generate the first signal of the first terminal which is relatively close to the base station using the multiplexing scheme. The base station may generate the second signal of the second terminal which is relatively remote from the base station by using the diversity scheme. The diversity scheme may include a technique which transmits the same symbol over a plurality of antennas in the same time interval. According to various embodiments of the present disclosure, the base station may increase a total channel capacity supported in the entire cell for a certain time duration, compared with the conventional OMA system or the conventional system NOMA. The second terminal may be on the cell boundary. The base station may increase the channel capacity of the second terminal.

In step 840, the base station may generate a second transmit signal based on the first signal, the second signal, the first power, and the second power. The second transmit signal may be derived from Equation 16.

$$s=\sqrt{P_1}\cdot s_1+\sqrt{P_2}\cdot s_2 \qquad \text{Equation 16}$$

s is the second transmit signal, $P_1$ is the first power, $P_2$ is the second power, $s_1$ is the first signal, and $s_2$ is the second signal. The base station may generate the first signal based on the multiplexing scheme of the NOMA system. The base station may generate the second signal based on the diversity scheme of the NOMA system.

Since the second transmit signal is the signal according to the first transmission mode and corresponds to the NOMA system, the base station may vary levels of the first power and the second power. The base station may allocate relatively low first power of the first terminal. The base station may allocate relatively high second power of the second terminal.

In step 850, the base station may transmit the generated second transmit signal to the first terminal and the second terminal. The second transmit signal is the signal according to the second transmission mode and thus may be the signal based on the NOMA system. The second transmit signal may include the first signal and the second signal. The first signal may include symbols generated using the multiplexing scheme. The second signal may include symbols generated the diversity scheme. Hence, the base station may transmit the second transmit signal in the same frequency resource and the same time resource. The base station may transmit the second transmit signal using the NOMA scheme. The base station may transmit the second transmit signal using a high MCS level.

FIG. 9 depicts an example of a radio environment in a transmission mode according to various embodiments. FIG. 9A depicts the radio environment example in a first transmission mode, FIG. 9B depicts the radio environment example in a second transmission mode, FIG. 9C depicts the radio environment example in a third transmission mode, and FIG. 9D depicts the radio environment example in a fourth transmission mode.

Figure 9A:
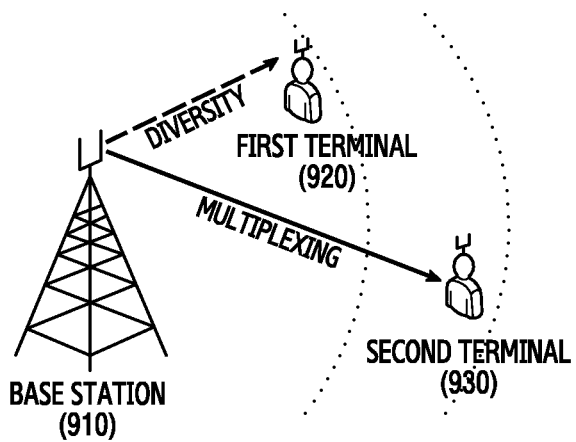
FIG. 9 depicts an example of a radio environment in a transmission mode according to various embodiments.

Referring to FIG. 9A, the first transmission mode is the scheme which, in the NOMA system, transmits using the diversity scheme to a first terminal 920 relatively close to a base station 910 and transmits using the multiplexing scheme to a second terminal 930 relatively remote from the base station 910. In the following, the first terminal 910 refers to the terminal relatively close to the base station, and the second terminal 920 refers to the terminal relatively remote from the base station.

The first transmission mode may be the first transmission mode of FIG. 5. The base station 910 in the first transmission mode may use the FTPA power allocation technique. The base station 910 may allocate more power to the terminal 930 which is relatively remote from the base station 910 by adjusting a coefficient in using the FTPA power allocation technique. In the power allocation, the base station may use a high MCS level. The terminal 920 close to the base station 910 may remove a signal of the remote terminal through the SIC in each time slot. The first terminal 920 may perform the STBC decoding operation based on the signal of each time slot.

Figure 9B:
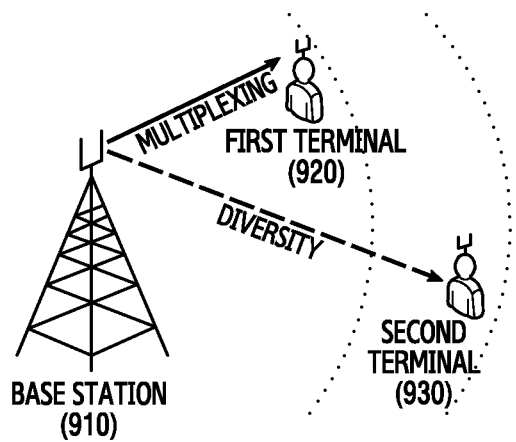

Referring to FIG. 9B, the second transmission mode is the scheme which, in the NOMA system, transmits using the multiplexing scheme to the first terminal 920 relatively close to the base station 910 and transmits using the diversity scheme to the second terminal 930 relatively remote from the base station 910. The second transmission mode may be the second transmission mode of FIG. 7. The second transmission mode may transmit symbols by using multiplexing gain for the terminal 920 relatively close to the base station 910 and using diversity gain for the terminal 930 relatively remote. The second terminal 930 may detect symbols to transmit from the base station 910 to the second terminal 930. If obtaining the symbols, a matched receive filter may be used. The base station 910 may use the FTPA power allocation technique. The base station 910 may allocate higher power to the terminal 930 than the terminal 920 by adjusting the coefficient in using the FTPA power allocation technique.

Figure 9C:
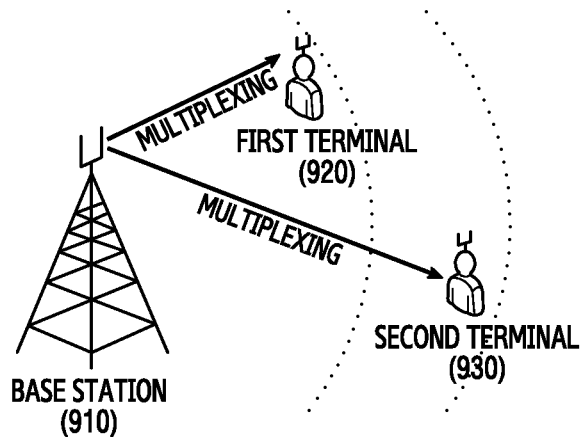

Referring to FIG. 9C, the third transmission mode is the NOMA scheme. It is the transmission scheme using the multiplexing scheme for both of the first terminal 920 and the second terminal 930. The base station 910 may use the FTPA in the third transmission mode. Both of the terminal 920 close to the base station 910 and the remote terminal 930 may obtain symbols as many as receive antennas in one time resource unit. According to an embodiment, both of the first terminal 920 and the second terminal 930 may detect signals respectively by using the MMSE receive filter.

Figure 9D:
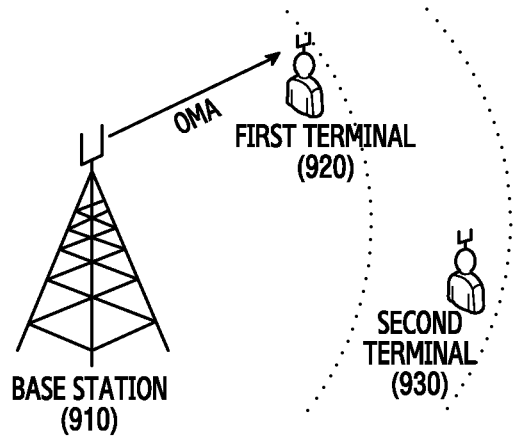

Referring to FIG. 9D, the fourth transmission mode is the OMA scheme. In the OMA scheme, the base station 910 may generate a signal satisfying orthogonality with respect to each of terminals. The base station 910 may transmit the generated signal to each of the first terminal 920 and the second terminal 930. The fourth transmission mode may support the terminal pair in two time slots separately. The base station 910 may transmit the signal at a frequency satisfying the orthogonality with respect to the first terminal 920 and second terminal 930.

A cell of the base station 910 may further include other terminals than the first terminal 920 and the second terminal 930 within the cell. By considering fairness and total capacities of the terminals inside the cell, the base station 910 may use a proportional fairness (PF) based scheduling technique. The base station 910 may determine the terminal pair to determine the transmission mode by using the scheduling technique. The base station 910 may determine the first terminal 920 and the second terminal 930 as the terminal pair.

The base station 910 may compare the channel capacities of the determined terminal pair. Specifically, the base station 910 may determine, among the transmission modes, the transmission mode which guarantees a grater total channel capacity of the first terminal 920 and the second terminal 930. In other words, the base station 910 may determine, among the four transmission modes, the transmission mode of the greatest channel capacity sum (total channel capacity) of the first terminal 920 and the second terminal 930. The base station 910 may transmit a transmit signal to the first terminal 920 and the second terminal 930 according to the determined transmission mode. The base station 910, the first terminal 920, and the second terminal 930 assume an environment including multiple antennas. Thus, the base station 910 may obtain the diversity gain or the multiplexing gain according to the determined transmission mode.

As described above, according to various embodiments, the base station and the terminals may perform communication according to one of the multiple transmission modes. In so doing, the terminals detect the signal according to the scheme corresponding to the mode selected for the signal transmission of the base station. Thus, the base station may be required to send control information for notifying the selected transmission mode, to the terminal. Hereafter, the control information is illustrated in FIG. 10.

Figure 10:
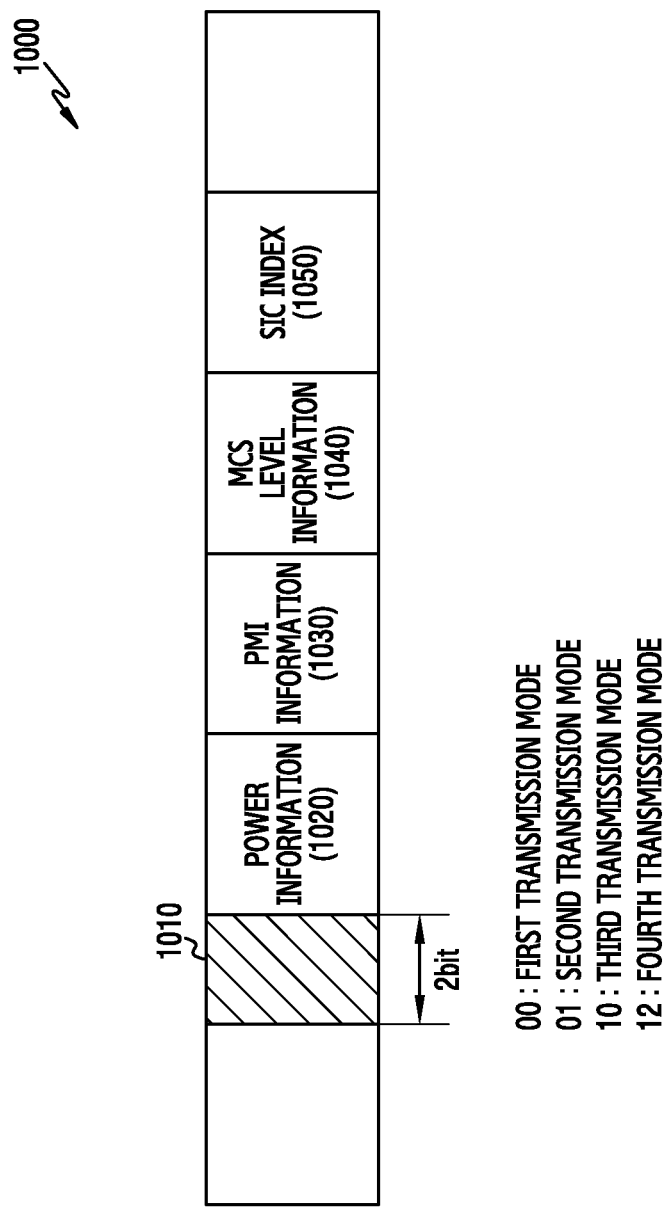
FIG. 10 depicts a structural example of control information according to various embodiments.

FIG. 10 depicts a structural example of control information according to various embodiments. The base station 910 of FIG. 9 may transmit the control information to the first terminal 920 or the second terminal 930 of FIG. 9. The base station 910 may transmit the control information, like the signal of FIG. 9, to the first terminal 920 or the second terminal 930.

Referring to FIG. 10, control information 1000 may include information for controlling communication between the base station and the terminal. According to various embodiments, the base station 910 may determine one of four transmission modes. The base station 910 may transmit indication information indicating the determined transmission mode to the first terminal 920 or the second terminal 930. For example, the information indicating the transmission mode, wherein the four transmission modes are feasible, may be represented with 2-bit information. The four transmission modes may be the first transmission mode, the second transmission mode, the third transmission mode, and the fourth transmission mode of FIG. 9.

Various embodiments of the present disclosure may be a hybrid system using multi-antenna gain. For hybrid operations, the base station 910 may transmit to users of the terminals, 2-bit additional information regarding the transmission mode. The 2-bit information may be a transmission mode indicator 1010. The control information 1000 may include the transmission mode indicator 1010, power information 1020, a precoding matrix indicator (PMI) 1030, MCS level information 1040, and SIC index 1050. The transmission mode indicator 1010 may be the 2-bit information as described above. The 2-bit information may represent four cases. For example, 00 may be the first transmission mode, 01 may be the second transmission mode, 10 may be the third transmission mode, and 11 may be the fourth transmission mode. In the following, the transmission mode indicator 1010 is explained based on, but not limited to, two bits. The power information 1020 may include power allocated to the first terminal 920 or the second terminal 930. The precoding matrix indicator 1030 may be an index indicating a precoding matrix to be used for the communication over a channel between the base station 910 and the first terminal 920 or the second terminal 930. The MCS level information 1040 may be a modulation and coding scheme applied to downlink from the base station 910 to the first terminal 920 or the second terminal 930 (or uplink from the first terminal 920 or the second terminal 930 to the base station 910). The SIC index 1050 may include information notifying the SIC operation to the first terminal 920 and information about a specific SIC operation of the first terminal 920.

Figure 11:
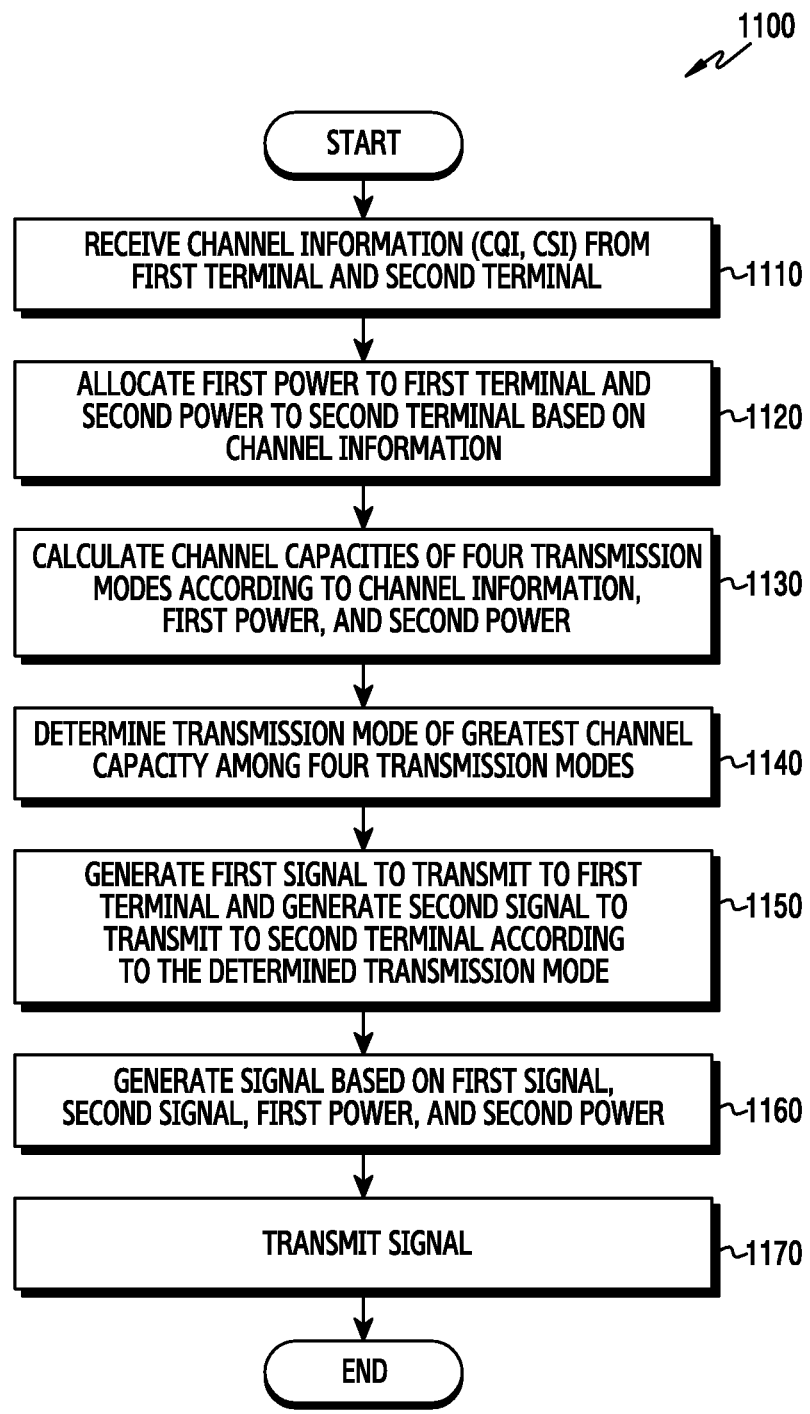
FIG. 11 is a flowchart of base station operations according to various embodiments.

FIG. 11 is a flowchart of base station operations according to various embodiments. The base station may be the base station 910 of FIG. 9.

Referring to FIG. 11, in step 1110, channel information may be received from a first terminal and a second terminal. The first terminal may be the first terminal 920 of FIG. 9. The second terminal may be the second terminal 930 of FIG. 9. The channel information may be CQI or CSI. The channel information may include channel gain.

In step 1120, based on the channel information, first power may be allocated to the first terminal 920 and second power may be allocated to the second terminal 930. The base station 910 may obtain a parameter for each of the terminals from the channel information. The parameter may be at least one of a received signal strength indicator (RSRI), a reference signal received quality (RSRQ), reference signal received power (RSRP), a signal to interference and noise ratio (SINR), a carrier to interference and noise ratio (CINR), and SNR. In the following, for the sake of explanations, it is referred to as the channel gain. If the channel gain of the first terminal 920 is great, the amount of the power allocated to the first terminal 920 may be small. If the channel gain is great, the base station 920 and the first terminal 920 may communicate in consistent performance with low power. For example, the performance may be at least one of error vector magnitude (EVM), BER, and block error rate (BLER). The base station 910 may use the FTPA power allocation scheme in allocating the first power and the second power. If the base station 910 uses the FTPA allocation scheme, the base station 910 may set a power allocation coefficient based on the channel gain of the first terminal 920 or the second terminal 930. The base station 910 may allocate the first power and the second power through the superposition coding.

In the NOMA system, since the first terminal 920 and second terminal 930 receive a first signal and a second signal on the same time-frequency resource domain, to identify the first signal and the second signal, the base station 910 may allocate different powers. As a difference of the first power and the second power increases, effect of using the NOMA system may enhance. In addition, according to various embodiments of the present disclosure, if a difference of the SNR of the first terminal and the SNR of the second terminal is not considerable, the base station 910 may maximize the effect of utilizing the NOMA system by differently allocating the first power and the second power.

In step 1130, channel capacities of transmission modes may be calculated according to the channel information, the first power, and the second power. The transmission modes may include four transmission modes. The four transmission modes may correspond to (a), (b), (c), (d) of FIG. 9.

In step 1140, the base station 910 may determine the transmission mode of the greatest channel capacity among the calculated four transmission modes. Based on the allocated power of the first terminal 920 or the second terminal 930 and the channel information, the base station 910 may determine the transmission mode of the greatest channel capacity among the multiple transmission modes. Information indicating the determined transmission mode may be represented with 2-bit information. The 2-bit information may represent four cases, which may correspond to the first transmission mode, the second transmission mode, the third transmission mode, and the fourth transmission mode respectively.

In step 1150, the first signal and the second signal may be generated according to the determined transmission mode. The first signal or the second signal including different symbols may be generated according to the determined transmission mode. The signals may be generated in the multiplexing scheme of the NOMA system, the diversity scheme of the NOMA system, or the transmission scheme of the OMA system. They may be generated differently according to the four transmission modes.

In step 1160, the signal may be generated based on the first signal, the second signal, the first power, and the second power. This may be expressed as Equation 17.

$$s=\sqrt{P_1}\cdot s_1+\sqrt{P_2}\cdot s_2 \qquad \text{Equation 17}$$

s is the signal, $P_1$ is the first power, $P_2$ is the second power, $s_1$ is the first signal, and $s_2$ is the second signal.

Since the signal is the signal according to the first transmission mode and corresponds to the NOMA system, levels of the first power and the second power may be different. The base station 910 may set the first power of the first terminal 920 relatively close to the base station 910 to be relatively low, and set the second power of the second terminal 930 relatively remote from the base station 910 to be relatively high. The base station 910 may generate the signal by applying a high MCS level.

In step 1170, the generated signal may be transmitted to the first terminal 920 or the second terminal 930. If the determined transmission mode is the first transmission mode, the second transmission mode, or the third transmission mode, the base station 910 may transmit to either of the first terminal 920 or the second terminal 930 in the same frequency resource and the same time resource. However, in the fourth transmission mode, the base station 910 may transmit in a different frequency resource or a different time resource, as in the transmission scheme of the OMA system. If transmitting in the same frequency resource, the base station 910 may transmit in a different time resource. It may be transmitted for each of the first terminal 920 or the second terminal 930.

Figure 12:
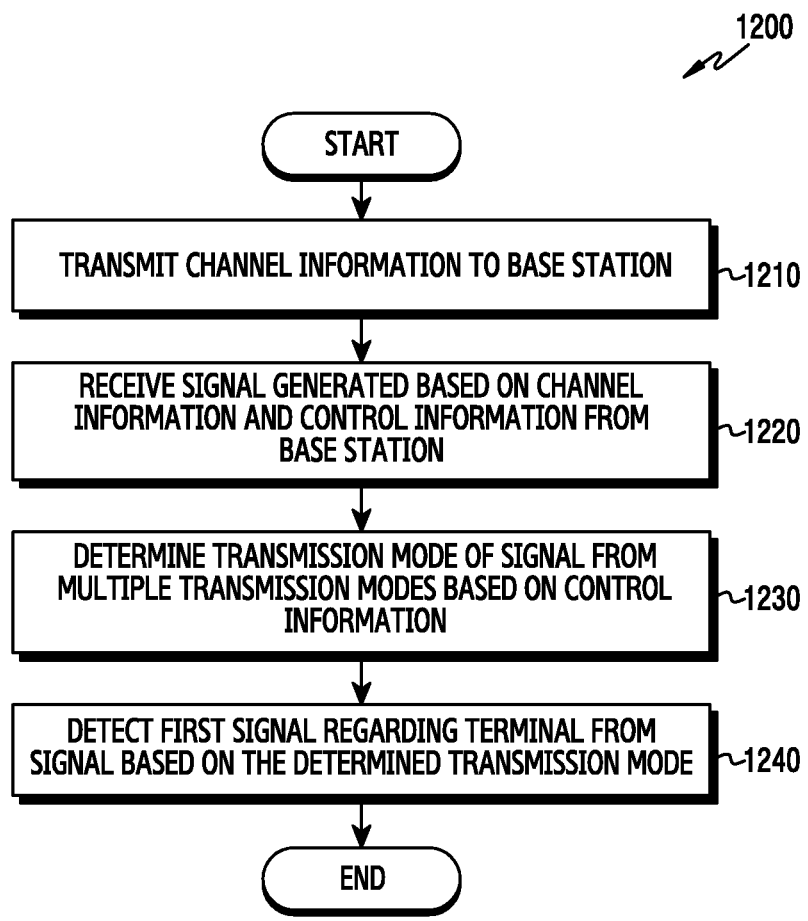
FIG. 12 depicts operations of a terminal according to various embodiments.

FIG. 12 depicts operations of a terminal according to various embodiments. The terminal may be the first terminal 920 or the second terminal 930 of FIG. 9.

Referring to FIG. 12, in step 1210, the terminal may transmit channel information to a base station. The channel information may be CQI or CSI. The channel information may include channel gain.

In step 1220, the terminal may receive a signal generated based on the channel information and control information from the base station. The channel information may include first channel information and second channel information. The first channel information may be channel information between the terminal and the base station. The second channel information may be channel information between other terminal and the base station. The signal may be generated based on a first signal relating to the terminal and a second signal relating to the other terminal.

In step 1230, based on the control information, a transmission mode of the signal may be determined from a plurality of transmission modes. The control information may be the control information 1000 of FIG. 10. The control information 1000 may include information indicating a transmission mode determined by the base station among the transmission modes. The information indicating the transmission mode may be the transmission mode indicator 1010 of FIG. 10.

The plurality of the transmission modes may include a first transmission mode which generates, in the NOMA scheme, the first signal using the diversity scheme and the second signal using the multiplexing scheme, a second transmission mode which generates, in the NOMA scheme, the first signal using the multiplexing scheme and the second signal using the diversity scheme, a third transmission mode which generates, in the NOMA scheme, the first signal and the second signal using the multiplexing scheme, and a fourth transmission mode which generates, in the OMA scheme, the first signal and the second signal. The transmission modes may be represented by 2-bit information. The terminal may determine the transmission mode of the signal based on the 2-bit information.

In step 1240, the first signal may be detected from the signal based on the determined transmission mode. That is, the terminal may divide received symbols into the first signal component and the second signal component according to the determined transmission mode. The terminal may detect the first signal from the first signal component. The terminal may remove the second signal component from the signal using the SIC. If the terminal is relatively closer to the base station than the other terminal, the SIC may be more efficient.

Figure 13:
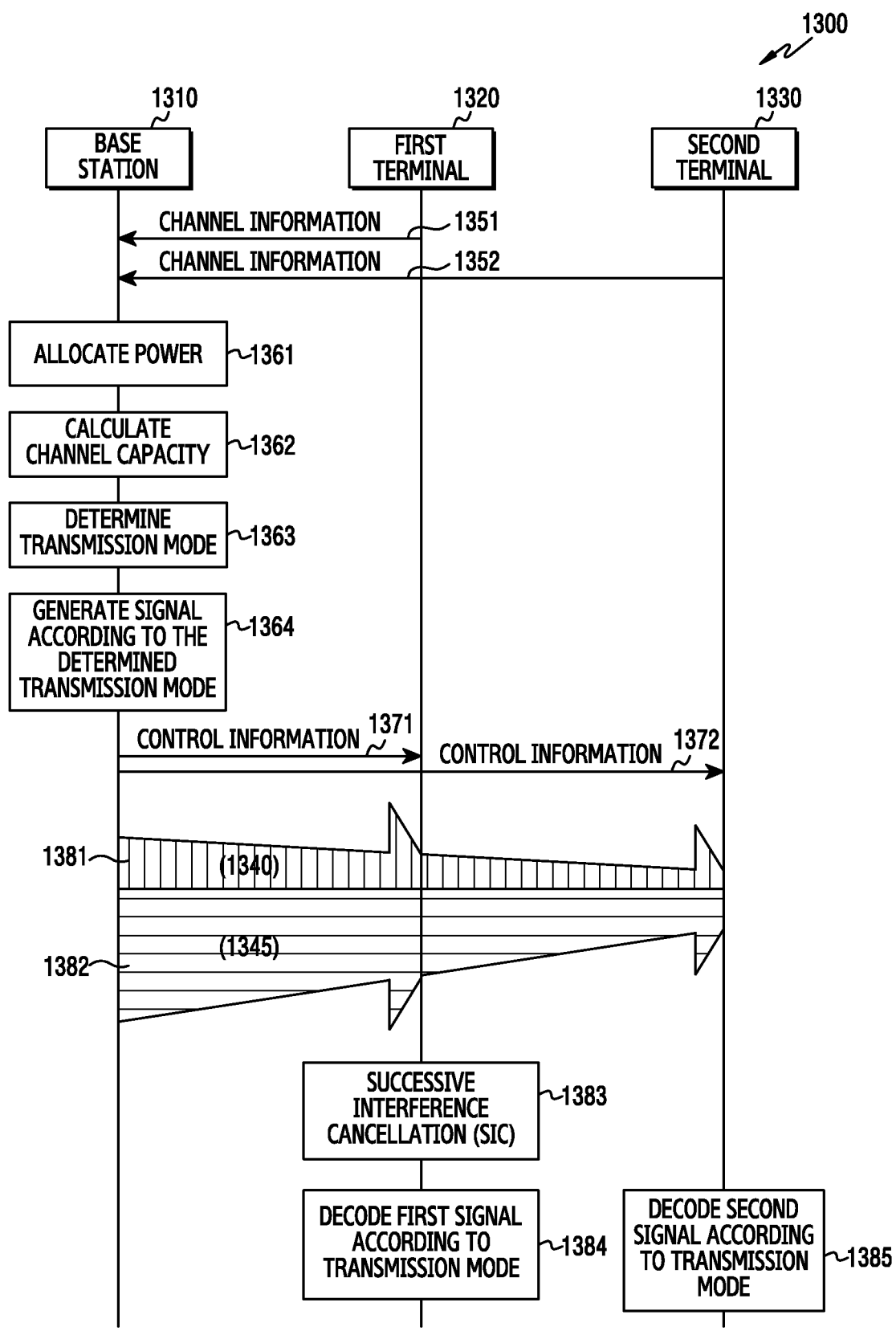
FIG. 13 depicts signal flows between a base station and terminals according to various embodiments.

FIG. 13 depicts signal flows between a base station and terminals according to various embodiments.

A network environment 1300 may include a base station 1310, a first terminal 1320, and a second terminal 1330. The first terminal 1320 is relatively closer to the base station 1310 than the second terminal 1330. The second terminal 1330 may be in a cell boundary of the base station 1310.

Referring to FIG. 13, in step 1351, the first terminal 1320 may transmit first channel information to the base station 1310. In step 1352, the second terminal 1330 may transmit second channel information to the base station 1310. The flow of FIG. 13 is merely an example of the channel information transmission operation, and does not define a specific order. In other words, unlike FIG. 13, the second terminal 1330 may transmit its first channel information before the first terminal 1320. The channel information may be CQI or CSI. The channel information may include channel gain. The channel gain may be the factor for determining power levels allocated to the first terminal and the second terminal in the NOMA system.

In step 1361, the base station 1310 may determine the powers to be allocated to the first terminal 1320 and second terminal 1330 based on the channel information. The base station 1310 may allocate the powers in inverse proportion to the channel gain of the terminal. According to various embodiments of the present disclosure, the base station 1310 may use the FTPA power allocation scheme. The base station 1310 may allocate the powers to the first terminal 1320 and the second terminal 1330 respectively through the superposition coding.

In step 1362, the base station 1310 may calculate a channel capacity of each of the transmission modes based on the determined powers and the channel gain. When calculating the channel capacity, the base station 1310 may use Equation 2 through Equation 14.

In step 1363, the base station 1310 may determine the transmission mode of the greatest channel capacity of the channel capacities among the transmission modes. According to various embodiments of the present disclosure, the transmission modes may include the four transmission modes of FIG. 9.

In step 1364, the base station 1310 may generate signals to be transmitted to the first terminal 1320 and the second terminal 1330 according to the determined transmission mode. According to the determined transmission mode, the generation scheme and the transmission scheme may differ. For example, if the determined transmission mode is the transmission scheme of the OMA system, that is, in the fourth transmission mode of FIG. 9, the base station 1310 may generate signals to be transmitted to the first terminal 1320 and the second terminal 1330 respectively. If the determined transmission mode is the first transmission mode of FIG. 9, the base station 1310 may transmit a transmit signal 1340 using the diversity scheme and transmit a transmit signal 1345 using the multiplexing scheme. The generated signal may include the transmit signal 1340 and the transmit signal 1345. The base station 1310 may transmit the generated signal to the first terminal 1320 and/or the second terminal 1330.

In step 1371 and step 1372, the base station 1310 may transmit control information to the first terminal 1320 or the second terminal 1330. The control information may be the control information 1000 of FIG. 10. The control information may include information indicating the determined transmission mode. For example, the information may be 2-bit information. The 2-bit information may represent the four transmission modes. It may be 2-bit information transmission mode indicator 1010. The four transmission modes may be the first transmission mode, the second transmission mode, the third transmission mode, and the fourth transmission mode of FIG. 9. Based on the 2-bit information, the first terminal 1320 may determine the transmission mode determined by the base station 1310. Herein, the mode indicated by the transmission mode indicator 1010 in the control information 1000 may be applied to the transmit signal 1340 and the transmit signal 1345, or to transmit signals (not shown) to be transmitted next. Further, the control information may further include information indicating a timing at which the mode indicated by the transmission mode indicator is applied, that is, information indicating which transmission signal is applied.

In step 1381 and step 1382, the base station 1310 may transmit the generated signal to the first terminal 1320 and the second terminal 1330. The signal may include the transmit signal 1340 and the transmit signal 1345. The transmit signal 1340 may be related to a first symbol to transmit to the first terminal 1320 and the power allocated to the first terminal 1320. The transmit signal 1345 may be related to a second symbol to transmit to the second terminal 1330 and the power allocated to the first terminal 1330. A relatively small region of the transmit signal 1340 in FIG. 13 may correspond to the low power allocated. A relatively large region of the transmit signal 1345 in FIG. 13 may correspond to the high power allocated. The first terminal 1320, which is relatively close to the base station 1310, may successfully decode the first signal to obtain, through a specific operation even with the low power allocated.

In step 1383, the first terminal 1320, which is close to the base station 1310, may remove the transmit signal 1345 through the SIC. In step 1384, the first terminal 1320 may obtain the first symbol by decoding the transmit signal 1340 according to the determined transmission mode. According to various embodiments of the present disclosure, since the base station 1310 transmits the information indicating the determined transmission mode to the first terminal 1320, the first terminal 1320 may successfully decode the first symbol by operating in the transmission mode.

In step 1385, the second terminal 1330 may obtain the second symbol by decoding the transmit signal 1345 according to the determined transmission mode, in the same manner as the first terminal 1320. In FIG. 13, the second terminal 1330 may receive the transmit signal 1340 with relatively weaker strength than the transmit signal 1345. Thus, even without the process such as the SIC, the second symbol may be acquired more easily than the first terminal 1320 in the detecting step.

Various embodiments of the present disclosure may demonstrate the effect in a simulation. If multiple terminals are distributed in a single cell, the base station may determine the transmission mode of each terminal. Also, by considering fairness and the total capacity between the terminals of the cell, the base station may determine a terminal pair through PF-based scheduling. The base station utilized the FTPA in power allocation, wherein a power allocation coefficient is set to 0.9 in the first transmission mode, to 0.9 in the second transmission mode, and to 0.5 in the third transmission mode. The rest simulation environment is given as shown in Table 1.

TABLE 1

| Parameter | Value |
| --- | --- |
| Inner area Ddstance | 500 m |
| Number of terminals | 20 |
| Number of Tx antennas of base station | 2 |
| Tx gain of base station | 0 dBi |
| Number of Rx antennas of base station | 2 |
| Rx gain of base station | 0 dBi |
| Maximum Tx Pwer | 46 dBm |

TABLE 1-continued

| Parameter | Value |
|---|---|
| Distance dependent path loss | 128.1 + 37.6log$_{10}$(r), r kilometers (dB) |
| Channel Model | Rayleigh fading channel |
| Receive noise density | −174 dBm/Hz |

The simulation obtained a total throughput of a cell wide terminal and a total throughput of a cell boundary terminal, and compared through performance improvement degree. The cell boundary in the simulation may indicate a terminal belonging to the lowest 5 percentage in SNR distribution of terminals within the cell. NOMA represents an environment including only the conventional OMA system and the conventional NOMA, and NOMA-Hybrid represents an environment including all of the four transmission modes according to various embodiments of the present disclosure. The simulation was conducted under the operation when the base station determines the four transmission modes according to the channel capacity according to various embodiments of the present disclosure. Results of the simulation are given as shown in Table 2.

TABLE 2

| Category | Performance Gain vs. OMA [%] |
|---|---|
| NOMA - total terminals in cell | 22.66 |
| NOMA-Hybrid - total terminals in cell | 23.69 |
| NOMA - terminal in cell boundary | 17.73 |
| NOMA-Hybrid - terminal in cell boundary | 22.98 |

Referring to Table 2, if the SNR difference between the terminal (the terminal inside the cell) which is relatively close to the base station and the terminal (the terminal of the cell boundary) which is relatively remote from the base station is great, a distance difference becomes considerable and thus a path loss difference increases. In this case, the conventional NOMA system may be utilized. The terminal within the cell, having the high SNR, may obtain the sufficient performance even with the multiplexing gain. However, if the SNRs of both of the terminal in the cell and the terminal on the cell boundary are low, the throughput may further rise by use of the diversity gain. That is, the NOMA-Hybrid system may guarantee greater transmission capacity to the cell boundary terminal and thus the transmission capacity of cell-wide terminals may slightly increase.

The NOMA may significantly improve the channel capacity of the terminal, but may not be efficient in the low-SINR environment. Hence, the OMA may be used in a channel environment where the NOMA is inefficient. However, the base station and the terminal according to various embodiments of the present disclosure may improve the channel capacity by using the transmission mode according to various embodiments even in the channel environment of the terminals where it is difficult to use the conventional NOMA. In particular, by use of the transmission mode according to various embodiments, the base station and the terminal may improve the channel capacity of the terminal at the cell boundary of the base station.

According to various embodiments, an operating method of a base station supporting multi-antenna may include determining a transmission mode of the greatest channel capacity among a plurality of transmission modes based on first channel information of a first terminal, second channel information of a second terminal, first power allocated to the first terminal, and second power allocated to the second terminal, transmitting control information indicating the determined transmission mode to the first terminal and the second terminal, and transmitting a signal generated in the determined transmission mode to the first terminal and the second terminal. At least one of the transmission modes may apply, in a NOMA scheme, a diversity scheme one of the first terminal and the second terminal and apply a multiplexing scheme to the other of the first terminal and the second terminal.

The control information may include at least one of the first power, the second power, a PMI, an MCS level, and an SIC index.

The first channel information and the second channel information may include at least one of CQI or CSI.

According to various embodiments, an operating method of a base station supporting multi-antenna may include generating a first signal regarding a first terminal to transmit in a diversity scheme, generating a second signal regarding a second terminal to transmit in a multiplexing scheme, generating a signal based on the first signal, the second signal, first power regarding the first terminal, and second power regarding the second terminal, transmitting, in an OMA scheme, the signal to the first terminal and the second terminal, wherein the first power and the second power may be allocated based on channel information of the first terminal and channel information of the second terminal.

If a distance value between the base station and the first terminal is smaller than a distance value between the base station and the second terminal, the diversity scheme may include STBC technique.

The diversity scheme may obtain diversity gain using at least one of an antenna of the base station, an antenna of the first terminal, or an antenna of the second terminal.

According to various embodiments, an operating method of a terminal supporting multi-antenna may include receiving control information from a base station, receiving a signal from the base station, determining a transmission mode of the signal based on the control information among a plurality of transmission modes, and detecting a first signal regarding the terminal from the signal based on the determined transmission mode, wherein the control information may include information indicating the determined transmission mode, the signal may be generated by the base station according to the determined transmission mode, and at least one of the transmission modes may apply, in a NOMA scheme, a diversity scheme one of the terminal and another terminal and apply a multiplexing scheme to the other of the terminal and the another terminal.

The control information may include at least one of power allocated to the terminal, power allocated to the another terminal, a PMI, an MCS level, and an SIC index.

The operating method may further include removing a second signal regarding the another terminal from the signal using SIC.

The channel information may include at least one of CQI or CSI.

According to various embodiments, a base station supporting multi-antenna may include a controller and a transmitter, wherein the controller is configured to determine a transmission mode of the greatest channel capacity among a plurality of transmission modes based on first channel information of a first terminal, second channel information of a second terminal, first power allocated to the first terminal, and second power allocated to the second terminal, the transmitter is configured to transmit control information indicating the determined transmission mode to the first terminal and the second terminal and to transmit a signal generated in the determined transmission mode to the first terminal and the second terminal, and at least one of the transmission modes may apply, in a NOMA scheme, a diversity scheme one of the first terminal and the second terminal and apply a multiplexing scheme to the other of the first terminal and the second terminal.

The control information may include at least one of the first power, the second power, a PMI, an MCS level, and an SIC index.

The first channel information and the second channel information may include at least one of CQI or CSI.

According to various embodiments, a base station supporting multi-antenna may include a controller and a transmitter. The controller may be configured to generate a first signal regarding a first terminal to transmit in a diversity scheme, to generate a second signal regarding a second terminal to transmit in a multiplexing scheme, and to generate a signal based on the first signal, the second signal, first power regarding the first terminal, and second power regarding the second terminal, and the transmitter is configured to transmit, in an OMA scheme, the signal to the first terminal and the second terminal. The first power and the second power may be allocated based on channel information of the first terminal and channel information of the second terminal.

If a distance value between the base station and the first terminal is smaller than a distance value between the base station and the second terminal, the diversity scheme may include STBC technique.

The diversity scheme may obtain diversity gain using at least one of an antenna of the base station, an antenna of the first terminal, or an antenna of the second terminal.

According to various embodiments, a terminal supporting multi-antenna may include a receiver and a controller. The receiver may be configured to receive control information from a base station, and to receive a signal from the base station, the controller may be configured to determine a transmission mode of the signal based on the control information among a plurality of transmission modes, and to detect a first signal regarding the terminal from the signal based on the determined transmission mode, the control information may include information indicating the determined transmission mode, the signal may be generated by the base station according to the determined transmission mode, and at least one of the transmission modes may apply, in a NOMA scheme, a diversity scheme one of the terminal and another terminal and apply a multiplexing scheme to the other of the terminal and the another terminal.

The control information may include at least one of power allocated to the terminal, power allocated to the another terminal, a PMI, an MCS level, and an SIC index.

The operating method may further include removing a second signal regarding the another terminal from the signal using SIC.

The channel information may include at least one of CQI or CSI.

The methods according to the embodiments described in the claims or the specification of the present disclosure may be implemented in software, hardware, or a combination of hardware and software.

If implementing in software, a computer-readable storage medium storing one or more programs (software modules) may be provided. One or more programs stored in the computer-readable storage medium may be configured for execution by one or more processors of an electronic device.

One or more programs may include instructions for controlling the electronic device to execute the methods according to the embodiments described in the claims or the specification of the present disclosure.

Such a program (software module, software) may be stored to a random access memory, a non-volatile memory including a flash memory, a read only memory (ROM), an electrically erasable programmable ROM (EEPROM), a magnetic disc storage device, a compact disc (CD)-ROM, digital versatile discs (DVDs) or other optical storage devices, and a magnetic cassette. Alternatively, the program may be stored to a memory combining part or all of those recording media. Also, a plurality of memories may be included.

Also, the program may be stored in an attachable storage device accessible via a communication network such as Internet, Intranet, local area network (LAN), wide LAN (WLAN), or storage area network (SAN), or a communication network by combining these networks. The storage device may access the apparatus which implements the embodiment of the present disclosure through an external port. Also, a separate storage device may access the apparatus which implements the embodiment of the present disclosure over the communication network.

In the specific embodiments of the present disclosure, the elements included in the disclosure are expressed in a singular or plural form according to the specific embodiment. However, the singular or plural expression is appropriately selected according to a proposed situation for the convenience of explanation, the present disclosure is not limited to a single element or a plurality of elements, the elements expressed in the plural form may be configured as a single element, and the elements expressed in the singular form may be configured as a plurality of elements.

Meanwhile, the detailed description of the present disclosure has explained specific embodiments thereof, but various modifications may be made without departing from the scope of this disclosure. Therefore, the scope of this disclosure should not be limited to the described embodiments but should be defined by the claims as below and their equivalents within the scope of the claims.

The invention claimed is:

1. A method performed by a base station in a wireless communication system, the method comprising:
   identifying a transmission mode among a plurality of transmission modes based on first channel information of a first terminal and second channel information of a second terminal; and
   transmitting, to the first terminal and the second terminal, a transmit signal generated based on the identified transmission mode,
   wherein the transmit signal comprises a first signal for the first terminal and a second signal for the second terminal,
   wherein the plurality of transmission modes includes:
      a first transmission mode for applying a diversity scheme to the first signal, applying a multiplexing scheme to the second signal and transmitting the transmit signal in a non-orthogonal multiple access (NOMA) scheme,
      a second transmission mode for applying the multiplexing scheme to the first signal, applying the diversity scheme to the second signal and transmitting the transmit signal in the NOMA scheme, a third transmission mode for applying the multiplexing scheme to the first signal and the second signal and transmitting the transmit signal in the NOMA scheme, and a fourth transmission mode for transmitting the transmit signal in an orthogonal multiple access (OMA) scheme.

2. The method of claim 1, further comprising:

transmitting control information indicating the identified transmission mode to the first terminal and the second terminal, wherein the control information further comprises at least one of a first power related to the first signal, a second power relating to the second signal, a precoding matrix indicator (PMI), a modulation and coding scheme (MCS) level, or a successive interference cancellation (SIC) index.

3. The method of claim 1, wherein the first channel information comprises channel state information (CSI) related to the first terminal and the second channel information comprises channel state information (CSI) related to the second terminal.

4. The method of claim 1, further comprising:

if the identified transmission mode is one of the first transmission mode, the second transmission mode, and the third transmission mode, generating the transmit signal based on a first power relating to the first terminal and a second power relating to the second terminal, wherein the first power and the second power are allocated based on the first channel information and the second channel information.

5. The method of claim 4, further comprising:

if a parameter in the first channel information is greater than a parameter in the second channel information, allocating the first power and the second power such that the first power is greater than the second power; and if the parameter in the first channel information is not greater than the parameter in the second channel information, allocating the first power and the second power such that the second power is greater than the first power.

6. The method of claim 5, wherein the parameter is at least one of a received signal strength indicator (RSRI), a reference signal received quality (RSRQ), a reference signal received power (RSRP), a signal to interference and noise ratio (SINR), a carrier to interference and noise ratio (CINR), or a signal to noise ratio (SNR).

7. The method of claim 1, wherein identifying the transmission mode comprises:

determining a channel capacity of each of the plurality of transmission modes based on the first channel information and the second channel information; and identifying the transmission mode of a greatest channel capacity among a plurality of transmission modes based on the determined channel capacity of each of the plurality of transmission modes.

8. A base station in a wireless communication system, the base station comprising:

at least one processor configured to identify a transmission mode among a plurality of transmission modes based on first channel information of a first terminal and second channel information of a second terminal; and at least one transceiver configured to transmit, to the first terminal and the second terminal, a transmit signal generated based on the identified transmission mode, wherein the transmit signal comprises a first signal for the first terminal and a second signal for the second terminal, wherein the plurality of transmission modes includes:

a first transmission mode for applying a diversity scheme to the first signal, applying a multiplexing scheme to the second signal and transmitting the transmit signal in a non-orthogonal multiple access (NOMA) scheme, a second transmission mode for applying the multiplexing scheme to the first signal, applying the diversity scheme to the second signal and transmitting the transmit signal in the NOMA scheme, a third transmission mode for applying the multiplexing scheme to the first signal and the second signal and transmitting signal in the NOMA scheme, and a fourth transmission mode for transmitting the transmit signal in an orthogonal multiple access (OMA) scheme.

9. The base station of claim 8, wherein the at least one processor is, identify the transmission mode, configured to:

determine a channel capacity of each of the plurality of transmission modes based on the first channel information and the second channel information; and identify the transmission mode of a greatest channel capacity among a plurality of transmission modes based on the determined channel capacity of each of the plurality of transmission modes.

10. The base station of claim 8, wherein the at least one transceiver is further configured to transmit control information indicating the identified transmission mode to the first terminal and the second terminal, and wherein the control information further comprises at least one of a first power relating to the first signal, a second power relating to the second signal, a precoding matrix indicator (PMI), a modulation and coding scheme (MCS) level, or a successive interference cancellation (SIC) index.

11. The base station of claim 8, wherein the first channel information comprises channel state information (CSI) related to the first terminal and the second channel information comprises channel state information (CSI) related to the second terminal.

12. The base station of claim 8, wherein the at least one processor is further configured to:

if the identified transmission mode is one of the first transmission mode, the second transmission mode, and the third transmission mode, generating the transmit signal based on a first power relating to the first terminal and a second power relating to the second terminal, wherein the first power and the second power are allocated based on the first channel information and the second channel information.

13. The base station of claim 12, wherein the at least one processor is further configured to:

if a parameter in the first channel information is greater than a parameter in the second channel information, allocate a first power and a second power such that the first power is greater than the second power; and if the parameter in the first channel information is not greater than the parameter in the second channel information, allocate the first power and the second power such that the second power is greater than the first power.

14. The base station of claim 13, wherein the parameter is at least one of a received signal strength indicator (RSRI), a reference signal received quality (RSRQ), a reference signal received power (RSRP), a signal to interference and noise ratio (SINR), a carrier to interference and noise ratio (CINR), or a signal to noise ratio (SNR).

15. A first terminal in a wireless communication system, the first terminal comprising:
at least one transceiver configured to:
receive control information identifying a transmission mode for a transmit signal among a plurality of transmission modes, from a base station; and
receive the transmit signal from the base station; and
at least one processor configured to:
detect a signal for the first terminal from the transmit signal based on the transmission mode,
wherein the transmit signal is generated and transmitted by the base station based on the transmission mode,
wherein the transmit signal comprises a first signal for the first terminal and a second signal for a second terminal,
wherein the plurality of transmission modes includes:
a first transmission mode for applying a diversity scheme to the first signal, applying a multiplexing scheme to the second signal and transmitting the transmit signal in a non-orthogonal multiple access (NOMA) scheme,
a second transmission mode for applying the multiplexing scheme to the first signal, applying the diversity scheme to the second signal and transmitting the transmit signal in the NOMA scheme,
a third transmission mode for applying the multiplexing scheme to the first signal and the second signal and transmitting the transmit signal in the NOMA scheme, and
a fourth transmission mode for transmitting the transmit signal in an orthogonal multiple access (OMA) scheme.

16. The first terminal of claim 15, wherein the at least one processor is further configured to:
remove the second signal from the transmit signal using a successive interference cancellation (SIC) technology.

17. The first terminal of claim 15, wherein the transmission mode is a transmission mode of a greatest channel capacity among the plurality of the transmission modes, based on channel information of the first terminal and channel information of the second terminal.

* * * * *